(12) United States Patent
Yang et al.

(10) Patent No.: US 12,103,614 B2
(45) Date of Patent: *Oct. 1, 2024

(54) SYSTEMS AND METHODS FOR INTELLIGENTLY IMPLEMENTING AN AUTONOMOUS ELECTRIC-POWERED TRAILER DURING A TOWING OPERATION

(71) Applicant: Pebble Mobility, Inc., Sunnyvale, CA (US)

(72) Inventors: Bingrui Yang, Los Altos, CA (US); Stefan Solyom, Los Altos, CA (US)

(73) Assignee: Pebble Mobility, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,247

(22) Filed: Feb. 9, 2024

(65) Prior Publication Data

US 2024/0182126 A1  Jun. 6, 2024

Related U.S. Application Data

(63) Continuation of application No. 18/197,023, filed on May 12, 2023, now Pat. No. 11,945,530.

(60) Provisional application No. 63/442,997, filed on Feb. 2, 2023, provisional application No. 63/391,650, filed on Jul. 22, 2022, provisional application No. 63/342,218, filed on May 16, 2022.

(51) Int. Cl.
*B62D 59/04* (2006.01)
*B60L 15/20* (2006.01)
*B60W 50/10* (2012.01)

(52) U.S. Cl.
CPC .......... *B62D 59/04* (2013.01); *B60L 15/2009* (2013.01); *B60L 15/2036* (2013.01); *B60W 50/10* (2013.01); *B60L 2200/28* (2013.01); *B60L 2240/24* (2013.01); *B60L 2240/26* (2013.01); *B60L 2240/423* (2013.01)

(58) Field of Classification Search
None
See application file for complete search history.

(56) References Cited

U.S. PATENT DOCUMENTS

| 11,485,330 | B1 | 11/2022 | Kulkarni |
| 11,685,265 | B2 | 6/2023 | Deaton et al. |
| 2013/0079980 | A1 | 3/2013 | Vuk et al. |
| 2022/0355860 | A1* | 11/2022 | Rydström .............. B62D 13/00 |

* cited by examiner

*Primary Examiner* — Todd Melton
(74) *Attorney, Agent, or Firm* — Padowithz Alce; Quintin Scheitlin; Alce PLLC

(57) ABSTRACT

A method of implementing an autonomous electric-powered trailer during a towing operation includes sourcing, via the one or more computers, one or more streams of sensing data from one or more sensing sources during a towing event involving an autonomous electric-powered (AEP) trailer and a towing entity, generating, via a towing-assist control algorithm, a plurality of towing-assistance instructions based on an input of the one or more streams of sensing data; operating, via one or more electric motors, each wheel of the AEP trailer at a target propulsion based on the plurality of towing-assistance instructions, wherein the operating of the each wheel enables the AEP trailer to autonomously assist the towing entity during the towing event.

20 Claims, 12 Drawing Sheets

200

Sourcing Control-Informative Driving Data S210

Deriving Towing-Informative Control Inputs S220

Generating AEP Trailer Control Instructions S230

Autonomously Executing Driving Operations S240

Continuously Executing Safety and Fault Detection Processes S250

FIGURE 2

SYSTEMS AND METHODS FOR INTELLIGENTLY IMPLEMENTING AN AUTONOMOUS ELECTRIC-POWERED TRAILER DURING A TOWING OPERATION

CROSS-REFERENCE TO RELATED APPLICATIONS

This application is a continuation of U.S. patent application Ser. No. 18/197,023, filed 12 May 2023, which claims the benefit of U.S. Provisional Application No. 63/442,997, filed 2 Feb. 2023, U.S. Provisional Application No. 63/391,650, filed 22 Jul. 2022, and U.S. Provisional Application No. 63/342,218, filed 16 May 2022, which are incorporated herein in their entireties by this reference.

TECHNICAL FIELD

This invention relates generally to the autonomous electric trailer field, and more specifically, to a new and useful system and method for intelligently configuring and executing autonomous driving operations at an autonomous electric-powered trailer.

BACKGROUND

Modern vehicle trailer design and technology appear to be misaligned with the evolution, current technologies, and designs of towing vehicles. In particular, standard vehicle trailers are designed to be passive entities that only move or stop when forces generated by a tow vehicle acts on these trailers. However, as a significant sum of modern vehicles are transitioning to alternative powering mechanisms (e.g., electric power) for driving and operating these modern vehicles, driving range often becomes a concern when a passive trailer is in tow. Similarly, lesser towing-capable vehicles (e.g., sedans or the like) that may use typical combustion engines may have difficulty towing standard trailers carrying challenging loads.

Thus, there is a need in the autonomous electric trailer field to create new and useful methods and systems for an autonomous and assistive movement of an electric-powered trailer. The embodiments of the present application described herein provide technical solutions that address, at least, the need described above.

BRIEF SUMMARY OF THE INVENTION(S)

In some embodiments, a method of implementing an autonomous electric-powered trailer during a towing operation includes identifying, via one or more computers, a towing event between an autonomous electric-powered (AEP) trailer and a towing entity; activating, via the one or more computers, a towing assist operating mode of the AEP trailer based on the identifying of the towing event; sourcing, via the one or more computers, one or more streams of sensing data from one or more sensing sources based on the activating of the towing assist operating mode; generating, via a towing-assist control algorithm, a plurality of towing-assistance instructions based on an input of the one or more streams of sensing data, wherein generating the plurality of towing-assistance instructions include: estimating, via the towing-assist control algorithm, an amount of towing-assistance to provide to the towing entity, and computing, via the towing-assist control algorithm, the plurality of towing-assistance instructions based on the estimating of the amount of towing-assistance to provide to the towing entity; and operating, via one or more electric motors, each wheel of the AEP trailer at a target rotation speed based on the plurality of towing-assistance instructions, wherein the operating of the each wheel enables the AEP trailer to autonomously assist the towing entity during the towing event.

In some embodiments, estimating the amount of towing-assistance to provide to the towing entity includes identifying, from the one or more streams of sensing data, one or more towing forces acting on the AEP trailer, calculating, via one or more towing force mitigation algorithms, an amount of towing-assistance required to at least partially counteract each of the one or more towing forces, and computing, via the towing-assist control algorithm, a total amount of towing-assistance to provide to the towing entity based on an input of the amount of towing-assistance required by each of the one or more towing forces.

In some embodiments, the one or more towing forces include a towing force pushing on the AEP trailer, and the amount of towing-assistance computed for the towing force defines an amount of assistive propulsion needed to counteract the effect of the towing force on the AEP trailer.

In some embodiments, the one or more towing forces include a towing force pulling on the AEP trailer, and the amount of towing-assistance computed for the towing force defines an amount of assistive braking needed to counteract the effect of the towing force on the AEP trailer.

In some embodiments, the one or more streams of sensing data comprise a stream of sensing data measuring a towing force present at a towing nexus of the AEP trailer and the towing entity, the towing force changes as the towing entity performs different driving operations or maneuvers, and the estimating of the amount of towing-assistance to provide to the towing entity is at least based on the towing force present at the towing nexus.

In some embodiments, the stream of sensing data is sourced from one or more sensors mounted on the AEP trailer, the one or more sensors measure an amount of strain imposed on the AEP trailer by the towing event, and estimating the amount of towing-assistance to provide to the towing entity includes: converting, via a towing strain-to-towing assistance conversion algorithm, the amount of strain imposed on the AEP trailer to a proportional amount of towing-assistance.

In some embodiments, the towing nexus includes a tongue of the AEP trailer, and the one or more sensors at least measure an amount of strain imposed on a tongue of the AEP trailer due to the towing event.

In some embodiments, the towing nexus includes an AEP trailer coupler, the AEP trailer coupler comprises an A-frame structure, and the one or more sensors at least measure an amount of strain imposed on each arm of the A-frame structure due to the towing event.

In some embodiments, the towing nexus comprises a coupler of the AEP trailer and a tow hitch of the towing entity, the stream of sensing data is sourced from one or more sensors mounted on the tow hitch, the one or more sensors measure an amount of strain imposed on the tow hitch by the towing event, and estimating the amount of towing-assistance to provide to the towing entity includes: converting, via a towing strain-to-towing assistance conversion algorithm, the amount of strain imposed on the tow hitch to a proportional amount of towing-assistance.

In some embodiments, the towing entity accelerates during a first portion of the towing event and decelerates during a second portion of the towing event, estimating the amount of towing-assistance to provide to the towing entity during the first portion and the second portion of the towing event includes: interpolating one or more body dynamics of the towing entity based on the one or more streams of sensing data, including: a rate of acceleration of the towing entity during the first portion of the towing event; and a rate of deceleration of the towing entity during the second portion of the towing event, and deriving, via a body dynamics conversion algorithm: an amount of propulsion needed to mirror the rate of acceleration of the towing entity during the first portion of the towing event; and an amount of braking needed to mirror the rate of deceleration of the towing entity during the second portion of the towing event.

In some embodiments, the plurality of towing-assistance instructions generated during the first portion of the towing event include one or more motor control instructions defining a target operating voltage for each of the one or more electric motors based on the amount of propulsion needed to mirror the rate of acceleration of the towing entity, and operating the each wheel of the AEP trailer includes: providing the one or more motor control instructions to a motor control algorithm controlling the one or more electric motors, and executing, via the motor control algorithm, the one or more motor control instructions.

In some embodiments, the plurality of towing-assistance instructions generated during the second portion of the towing event include: one or more motor control instructions defining a target operating voltage for each of the one or more electric motors based on the amount of braking needed to mirror the rate of deceleration of the towing entity, and operating the each wheel of the AEP trailer includes: providing the one or more motor control instructions to a motor control algorithm of the AEP trailer, and executing, via the motor control algorithm, the one or more motor control instructions.

In some embodiments, the towing entity is performing a turning maneuver during the towing event, and estimating the amount of towing-assistance to provide to the towing entity includes: interpolating one or more body dynamics of the towing entity based on the one or more streams of sensing data, including a steering angle of the towing entity; and deriving, via a body dynamics conversion algorithm, an amount of propulsion or braking needed for each distinct wheel of the AEP trailer to emulate the steering angle of the towing entity.

In some embodiments, the AEP trailer comprises a first distinct wheel and a second distinct wheel, the first distinct wheel is controlled by a first distinct electric motor of the AEP trailer, the second distinct wheel is controlled by a second distinct electric motor, and generating the plurality of towing-assist instructions includes: generating a motor control instruction defining a first operating voltage for the first distinct electric motor based on the amount of propulsion or braking needed from the first distinct wheel, and generating a motor control instruction defining a second operating voltage for the second distinct electric motor based on the amount of propulsion or braking needed from the second distinct wheel.

In some embodiments, operating the first distinct electric motor and the second distinct electric motor at different operating voltages causes a steering direction of the AEP trailer to change.

In some embodiments, a method of implementing an autonomous electric-powered trailer during a towing includes sourcing, via the one or more computers, one or more streams of sensing data from one or more sensing sources during a towing event involving an autonomous electric-powered (AEP) trailer and a towing entity, generating, via a towing-assist control algorithm, a plurality of towing-assistance instructions based on an input of the one or more streams of sensing data, wherein generating the plurality of towing-assistance instructions include: estimating, via the towing-assist control algorithm, an amount of towing-assistance to generate, and computing, via the towing-assist control algorithm, the plurality of towing-assistance instructions based on the estimating of the amount of towing-assistance; and operating, via one or more electric motors, each wheel of the AEP trailer at a target wheel speed based on the plurality of towing-assistance instructions, wherein the operating of the each wheel enables the AEP trailer to autonomously assist the towing entity during the towing event.

In some embodiments, the AEP trailer includes a first pair of wheels and a second pair of wheels, and estimating the amount of towing-assistance includes estimating an amount of assistive torque to generate via the first pair of wheels, and estimating an amount of assistive braking to generate via the second pair of wheels.

In some embodiments, the sourcing of the one or more streams of sensing data includes: measuring, at a towing nexus between the AEP trailer and the towing entity, a towing force applied by the towing entity, and estimating the amount of towing-assistance is based on the towing force measured at the towing nexus.

In some embodiments, a method of implementing an autonomous electric-powered trailer during a towing operation includes sourcing, via the one or more computers, one or more streams of sensing data from one or more sensing sources during a towing event involving an autonomous electric-powered (AEP) trailer and a towing entity, generating, via a towing-assist control algorithm, a plurality of towing-assist instructions based on an input of the one or more streams of sensing data; operating, via one or more electric motors, each wheel of the AEP trailer at a target propulsion based on the plurality of towing-assistance instructions, wherein the operating of the each wheel enables the AEP trailer to autonomously assist the towing entity during the towing event.

In some embodiments, the AEP trailer is greater than a towing capacity of the towing entity, and the plurality of towing-assist instructions are generated based on one or more of: a likely steering angle of the towing entity, a likely wheel speed of one or more wheels of the towing entity, or a likely grade of a road being traversed by the towing entity.

In some embodiments, a method of implementing an autonomous electric-powered trailer during a towing operation includes identifying, via one or more computers, a towing event between an autonomous electric-powered (AEP) trailer and a towing entity; activating, via the one or more computers, a towing assist operating mode of the AEP trailer based on the identifying of the towing event; sourcing, via the one or more computers, one or more streams of sensing data from one or more sensing sources based on the activating of the towing assist operating mode; generating, via a towing-assist control algorithm, a plurality of towing-assistance instructions based on an input of the one or more streams of sensing data, wherein generating the plurality of towing-assistance instructions includes: estimating, via the towing-assist control algorithm, an amount of towing-assistance to provide to the towing entity, and computing, via the towing-assist control algorithm, the plurality of towing-assistance instructions based on the estimating of the amount of towing-assistance to provide to the towing entity; and operating each wheel of the AEP trailer at a target torque based on the plurality of towing-assistance instructions, wherein the operating of the each wheel enables the AEP trailer to autonomously assist the towing entity during the towing event.

In some embodiments, estimating the amount of towing-assistance to provide to the towing entity includes: deriving one or more driving characteristics of the AEP trailer or the towing entity based on fusing the one or more streams of sensing data, calculating, via one or more towing force mitigation algorithms, an amount of towing-assistance required to at least partially compensate for each of the one or more driving characteristics.

In some embodiments, the one or more driving characteristics result in a towing force pushing on the AEP trailer, and the amount of towing-assistance defines an amount of assistive braking needed to compensate for the towing force.

In some embodiments, the one or more driving characteristics result in a towing force pulling on the AEP trailer, and the amount of towing-assistance defines an amount of assistive propulsion needed to compensate for the towing force.

In some embodiments, the one or more streams of sensing data comprise a stream of sensing data measuring a towing force present at a towing nexus of the AEP trailer and the towing entity, the towing force changes as the towing entity performs different driving operations or maneuvers, and the estimating of the amount of towing-assistance to provide to the towing entity is based on the towing force present at the towing nexus.

In some embodiments, the stream of sensing data is sourced from one or more sensors mounted on the AEP trailer, the one or more sensors measure an amount of strain imposed on the AEP trailer by the towing event, and estimating the amount of towing-assistance to provide to the towing entity includes: converting, via a towing strain-to-towing assistance conversion algorithm, the amount of strain imposed on the AEP trailer to a proportional amount of towing-assistance.

In some embodiments, the towing nexus includes a tongue of the AEP trailer, and the one or more sensors at least measure an amount of strain imposed on a tongue of the AEP trailer due to the towing event.

In some embodiments, the towing nexus includes an AEP trailer coupler, the AEP trailer coupler is connected to an A-frame structure, and the one or more sensors at least measure an amount of strain imposed on each arm of the A-frame structure due to the towing event.

In some embodiments, the towing nexus comprises a coupler of the AEP trailer and a tow hitch of the towing entity, the stream of sensing data is sourced from one or more sensors mounted on the tow hitch, the one or more sensors measure an amount of strain imposed on the tow hitch by the towing event, and estimating the amount of towing-assistance to provide to the towing entity includes: converting, via a towing strain-to-towing assistance conversion algorithm, the amount of strain imposed on the tow hitch to a proportional amount of towing-assistance.

In some embodiments, the towing entity accelerates during a first portion of the towing event and decelerates during a second portion of the towing event, estimating the amount of towing-assistance to provide to the towing entity during the first portion and the second portion of the towing event includes: (a) interpolating one or more driving dynamics of the towing entity based on the one or more streams of sensing data, including: a rate of acceleration of the towing entity during the first portion of the towing event; and a rate of deceleration of the towing entity during the second portion of the towing event, and deriving, via a driving dynamics conversion algorithm: an amount of propulsion needed to mirror the rate of acceleration of the towing entity during the first portion of the towing event; and an amount of braking needed to mirror the rate of deceleration of the towing entity during the second portion of the towing event.

In some embodiments, the plurality of towing-assistance instructions generated during the first portion of the towing event include: one or more control instructions based on the amount of propulsion needed to mirror the rate of acceleration of the towing entity, and operating the each wheel of the AEP trailer includes: providing the one or more control instructions to a control algorithm of the AEP trailer, and executing, via the control algorithm, the one or more control instructions to operate the each wheel of the AEP trailer at the target torque.

In some embodiments, the plurality of towing-assistance instructions generated during the second portion of the towing event include: one or more control instructions based on the amount of braking needed to mirror the rate of deceleration of the towing entity, and operating the each wheel of the AEP trailer includes: providing the one or more control instructions to a control algorithm of the AEP trailer, and executing, via the control algorithm, the one or more control instructions to operate the each wheel of the AEP trailer at the target torque.

In some embodiments, the towing entity is performing a turning maneuver during the towing event, and estimating the amount of towing-assistance to provide to the towing entity includes: interpolating one or more driving dynamics of the towing entity based on the one or more streams of sensing data, including a steering angle of the towing entity; and deriving, via a driving dynamics conversion algorithm, an amount of propulsion or braking needed for each distinct wheel of the AEP trailer to emulate the steering angle of the towing entity.

In some embodiments, the AEP trailer comprises a first distinct wheel and a second distinct wheel, the first distinct wheel is controlled by a first distinct electric motor of the AEP trailer, the second distinct wheel is controlled by a second distinct electric motor, and generating the plurality of towing-assistance instructions includes generating a motor control instruction for the first distinct electric motor based on the amount of propulsion or braking needed from the first distinct wheel, and generating a motor control instruction for the second distinct electric motor based on the amount of propulsion or braking needed from the second distinct wheel.

In some embodiments, operating the first distinct electric motor and the second distinct electric motor at different operating characteristics causes a steering direction of the AEP trailer to change.

In some embodiments, a method of implementing an autonomous electric-powered trailer during a towing operation includes sourcing, via the one or more computers, one or more streams of sensing data from one or more sensing sources during a towing event involving an autonomous electric-powered (AEP) trailer and a towing entity, generating, via a towing-assist control algorithm, a plurality of towing-assistance instructions based on an input of the one or more streams of sensing data, wherein generating the plurality of towing-assistance instructions includes: estimating, via the towing-assist control algorithm, an amount of towing-assistance to generate, and computing, via the towing-assist control algorithm, the plurality of towing-assistance instructions based on the estimating of the amount of towing-assistance; and operating each wheel of the AEP trailer at a target torque based on the plurality of towing-assistance instructions, wherein the operating of the each wheel enables the AEP trailer to autonomously assist the towing entity during the towing event.

In some embodiments, the AEP trailer includes a first set of one or more wheels and a second set of one or more wheels, and estimating the amount of towing-assistance includes: estimating an amount of assistive torque to generate via the first set of one or more wheels, and estimating an amount of assistive braking to generate via the second set of one or more wheels.

In some embodiments, the AEP trailer includes a first set of one or more wheels and a second set of one or more wheels, and estimating the amount of towing-assistance includes: estimating a first amount of assistive torque to generate via the first set of one or more wheels, and estimating a second amount of assistive torque to generate via the second set of one or more wheels.

In some embodiments, a method of implementing an autonomous electric-powered trailer during a towing operation includes: sourcing, via the one or more computers, one or more streams of sensing data from one or more sensing sources during a towing event involving an autonomous electric-powered (AEP) trailer and a towing entity, generating, via a towing-assist control algorithm, a plurality of towing-assistance instructions based on an input of the one or more streams of sensing data; and operating each wheel of the AEP trailer at a target propulsion based on the plurality of towing-assistance instructions.

In some embodiments, a weight of the AEP trailer is greater than a towing capacity of the towing entity, the operating of the each wheel enables the AEP trailer to provide towing-assistance to the towing entity for allowing the towing entity to tow the AEP trailer, and the plurality of towing-assistance instructions are generated based on one or more of: (a) a likely steering angle of the towing entity, (b) a likely wheel speed of one or more wheels of the towing entity, or (c) a likely grade of a road being traversed by the towing entity.

In some embodiments, a method of implementing an autonomous electric-powered trailer during a towing operation includes identifying, via one or more computers, a towing event between an autonomous electric-powered (AEP) trailer and a towing entity; activating, via the one or more computers, a towing assist operating mode of the AEP trailer based on the identifying of the towing event; sourcing sensing data from one or more sensing sources based on the activating of the towing assist operating mode; generating, via a towing-assist control algorithm, a plurality of towing-assistance instructions based on an input of the sensing data, wherein generating the plurality of towing-assistance instructions includes: estimating an amount of towing-assistance to provide to the towing entity, and computing the plurality of towing-assistance instructions based on the amount of towing-assistance to provide to the towing entity; and operating one or more wheels of the AEP trailer at a target torque or at a target braking based on executing the plurality of towing-assistance instructions, wherein the operating of the one or more wheels enables the AEP trailer to autonomously assist the towing entity during the towing event.

In some embodiments, estimating the amount of towing-assistance to provide to the towing entity includes observing one or more vehicle dynamics states of the AEP trailer or the towing entity based on the sensing data, and calculating the amount of towing-assistance to provide to the towing entity based on the one or more vehicle dynamics states.

In some embodiments, when the one or more vehicle dynamics states indicate that the towing entity is braking, the amount of towing-assistance defines an amount of assistive braking by the AEP trailer to provide to the towing entity.

In some embodiments, when the one or more vehicle dynamics states indicate that the towing entity is accelerating, the amount of towing-assistance defines an amount of assistive propulsion by the AEP trailer to provide to the towing entity.

In some embodiments, when the one or more vehicle dynamics states indicate that the towing entity is moving at a constant velocity, the amount of towing-assistance defines an amount of assistive torque by the AEP trailer to provide to the towing entity for maintaining the constant velocity of the towing entity.

In some embodiments, the sensing data comprises sensor data that measures a towing force at a towing nexus arranged between the AEP trailer and the towing entity, and the estimating of the amount of towing-assistance to provide to the towing entity is further based on the measured towing force at the towing nexus.

In some embodiments, the one or more sensing sources comprise one or more sensors mounted on the AEP trailer, the one or more sensors measure an amount of strain imposed on the AEP trailer or the towing entity during the towing event, and estimating the amount of towing-assistance to provide by the AEP trailer to the towing entity includes converting the amount of strain imposed on the AEP trailer or the towing entity to a proportional amount of towing-assistance.

In some embodiments, the towing nexus includes a tongue of the AEP trailer, and the one or more sensors at least measure an amount of strain imposed on the tongue of the AEP trailer due to the towing event.

In some embodiments, the towing nexus includes an AEP trailer coupler, the AEP trailer coupler is connected to an A-frame structure of the AEP trailer, and the one or more sensors at least measure an amount of strain imposed on each arm of the A-frame structure due to the towing event.

In some embodiments, the towing nexus comprises a coupler of the AEP trailer engaged with a tow hitch of the towing entity, the sensing data is sourced from one or more sensors mounted on the tow hitch, the one or more sensors measure an amount of strain imposed on the tow hitch by the towing event, and estimating the amount of towing-assistance to provide to the towing entity includes converting the amount of strain imposed on the tow hitch to a proportional amount of towing-assistance.

In some embodiments, estimating the amount of towing-assistance to provide to the towing entity includes interpolating one or more vehicle dynamics states of the towing entity based on the sensing data, including a current acceleration of the towing entity; and deriving, via a vehicle dynamics state conversion algorithm, an amount of propulsion needed to mirror the current acceleration of the towing entity.

In some embodiments, estimating the amount of towing-assistance to provide to the towing entity during includes interpolating one or more vehicle dynamics states of the towing entity based on the sensing data, including a current speed of the towing entity; and deriving, via a vehicle dynamics state conversion algorithm, an amount of assistive torque to provide to the towing entity based on the current speed of the towing entity; and In some embodiments, the plurality of towing-assistance instructions include one or more control instructions derived based on an amount of propulsion needed to mirror an acceleration of the towing entity, and operating the one or more wheels of the AEP trailer includes providing the one or more control instructions to a control algorithm of the AEP trailer, and executing, via the control algorithm, the one or more control instructions to accelerate the AEP trailer.

In some embodiments, the plurality of towing-assistance instructions include one or more control instructions derived based on an amount of braking needed to mirror a deceleration of the towing entity, and operating the one or more wheels of the AEP trailer includes providing the one or more control instructions to a control algorithm of the AEP trailer, and executing, via the control algorithm, the one or more control instructions to decelerate the AEP trailer.

In some embodiments, the plurality of towing-assistance instructions include one or more control instructions based on an amount of assistive torque to provide to the towing entity, and operating the one or more wheels of the AEP trailer includes providing the one or more control instructions to a control algorithm of the AEP trailer, and executing, via the control algorithm, the one or more control instructions to generate the amount of assistive torque via the one or more wheels of the AEP trailer.

In some embodiments, estimating the amount of towing-assistance to provide to the towing entity includes interpolating one or more vehicle dynamics states of the towing entity based on the sensing data, including a steering angle of the towing entity; and deriving, via a vehicle dynamics state conversion algorithm, an amount of steering assistance needed via one or more distinct wheels of the AEP trailer to emulate the steering angle of the towing entity.

In some embodiments, the AEP trailer comprises a first distinct wheel and a second distinct wheel, generating the plurality of towing-assistance instructions includes: generating a control instruction for independently operating the first distinct wheel and independently operating the second distinct wheel based on the amount of steering assistance needed via the first distinct wheel and the amount of steering assistance needed via the second distinct wheel.

In some embodiments, a method of implementing an autonomous electric-powered trailer during a towing operation includes sourcing, via the one or more computers, sensing data from one or more sensing sources during a towing event involving an autonomous electric-powered (AEP) trailer and a towing entity, generating, via a towing-assist control algorithm, a plurality of towing-assistance instructions based on an input of the sensing data, wherein generating the plurality of towing-assistance instructions includes estimating, via the towing-assist control algorithm, an amount of towing-assistance to generate, and computing, via the towing-assist control algorithm, the plurality of towing-assistance instructions based on the estimating of the amount of towing-assistance; and operating one or more wheels of the AEP trailer at a target torque or at a target braking based on the plurality of towing-assistance instructions, wherein the operating of the one or more wheels enables the AEP trailer to autonomously assist the towing entity during the towing event.

In some embodiments, estimating the amount of towing-assistance includes estimating an amount of assistive torque or braking to generate via at least one wheel of the AEP trailer.

In some embodiments, a method of implementing an autonomous electric-powered trailer during a towing operation includes sourcing, via the one or more computers, sensing data from one or more sensing sources during a towing event involving an autonomous electric-powered (AEP) trailer and a towing entity, generating, via a towing-assist control algorithm, a plurality of towing-assistance instructions based on an input of the sensing data; and operating one or more wheels of the AEP trailer at a target torque or at a target braking based on the plurality of towing-assistance instructions, wherein a weight of the AEP trailer is greater than a towing capacity of the towing entity, and the operating of the one or more wheels enables the AEP trailer to provide towing-assistance to the towing entity for allowing the towing entity to tow the AEP trailer.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the invention(s) is not intended to limit the invention(s) to these preferred embodiments, but rather to enable any person skilled in the art to make and use the invention(s).

1. Autonomous Electric-Powered Trailer System

Figure 1:
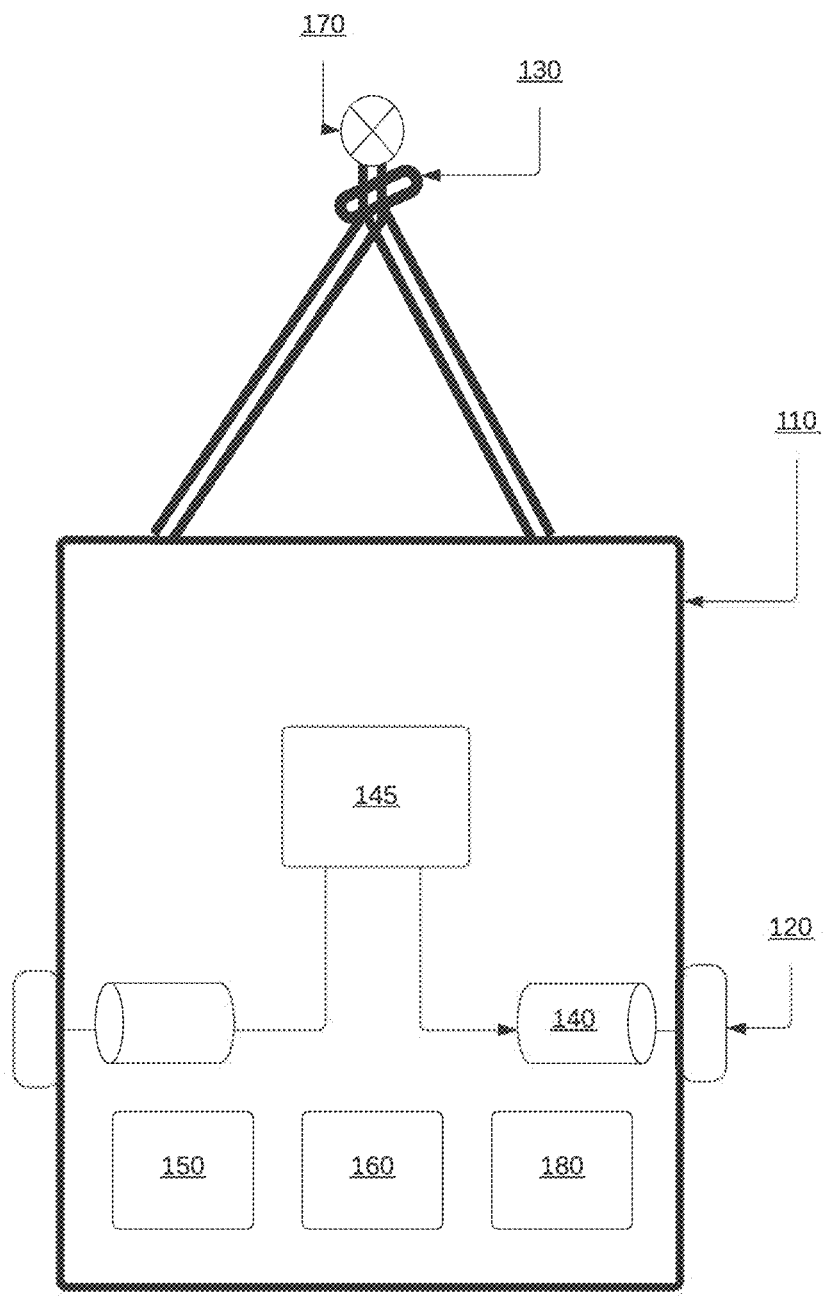
FIG. 1 illustrates a schematic representation of a system 100 in accordance with one or more embodiments of the present application.

As shown by reference to FIG. 1, an autonomous electric-powered trailer system 100 for assistive driving transport with a tow entity (e.g., a tow vehicle) and, in some circumstances, while detached from a tow entity, autonomous transport or movement may include a chassis 110 of an AEP trailer system 100, a plurality of wheels 120 (motorized/unmotorized), a steerable axle/caster wheel 130, one or more electric motors 140 powered by a battery subsystem 145, sensor suite 150, an autonomous trailer control subsystem 160, a coupler (e.g., tow vehicle hitch receiver) 170, and a trailer-tow vehicle communication interface or subsystem 180.

The autonomous electric-powered trailer system 100 may preferably be implemented in conjunction with a tow vehicle or the like having an independent propulsion system. In a tethered driving operation, an autonomous driving behavior of the AEP trailer system 100 may be responsive to and/or informed by an initial driving behavior of the tow vehicle. In such cases, the one or more sensing devices 150 of the AEP trailer system 100 may operate to identify driving activity and/or operations of a tow vehicle tethered to the AEP trailer system 100 and responsively compute autonomous movement and/or driving control instructions for the AEP trailer system 100.

1.10 Trailer Chassis

The chassis 110 of the AEP trailer system 100 preferably comprises a load-bearing framework of an artificial object that preferably structurally supports the artificial object in its construction and function. That is, in some embodiments, the chassis 110 may be an undercarriage used to transport a load or container over the road. In one or more embodiments, the chassis 110 may include a frame having a composition of one or more materials, which may include a combination of metals (e.g., steel) and/or wood-based components. The chassis 110 preferably additionally includes one or more axles that support the attachment of the plurality of wheels 120 and the caster wheel 130, a trailer tongue or the like that extends from a main body of the chassis, a coupler arranged at a distal end of the trailer tongue, a cranking or jacking mechanism arranged along the trailer tongue.

1.20 Wheels

The plurality of wheels 120 of the AEP trailer system 100 are preferably attached to the one or more axles of the chassis 110. In some embodiments, the plurality of wheels 120 may be powered by and/or include the one or more motors 140 and may include a braking system. The braking system, as generally referred to herein, may implement any suitable technique for slowing or stopping the AEP trailer system 100 including, but not limited to, hydraulic braking systems, electric braking systems, regenerative braking systems, disk-based brake systems, drum-based brake systems, or the like.

In a first implementation, each of the plurality of wheels 120 or a subset of the plurality of wheels 120 may include or may be powered at least one of the one or more motors 140. In this first implementation, the at least one motor of a given wheel may be independently powered and operated to enable an independent movement of the given wheel. While the at least one motor may enable an independent operation of the given wheel, it shall be recognized that each motor of each wheel may be operated in coordination or in concert to enable various driving operations of the AEP trailer system 100.

In a second implementation, each pair (i.e., left wheel/right wheel defining a pair) of the plurality of wheels 120 may be powered by a single motor of the one or more motors 140. In such embodiments, the single motor may be arranged along an axle onto which each distinct wheel of the pair of wheels may be arranged each respective end of the axle. In this second implementation, the pair of wheels may be operated in a coordination based on an operation of the single motor.

It shall be recognized that, in some embodiments, the AEP trailer system 100 may include a plurality of axles in which only a subset of the plurality of axles includes the one or more motors 140.

1.30 Steerable Axle|Caster Wheel

The steerable axle 130 preferably functions to support or enable directional movements of the AEP trailer system 100. In one or more embodiments, the steerable axle 130 includes a caster wheel. In one implementation, the steerable axle 130 may be powered by an independent motor of the one or more motors 140 arranged along the steerable axle 130 to rotate the caster wheel. In another implementation, the steerable axle 130 may be passive and a movement of the caster wheel may be encouraged by a movement of one or more of the plurality of wheels 120 when powered by the one or more motors 140.

Additionally, or alternatively, the steerable axle 130 may include a cranking or jacking mechanism (not shown) that operates to lift and lower the steerable axle 130. In one or more embodiments, the cranking or jacking mechanism may be electric-powered and an operation thereof automated and/or controlled by the AEP trailer system 100. In a non-limiting example, the cranking or jacking mechanism may be operated during one or more automated tethering or automated hitching operations in which the AEP trailer system 100 operates to automatically hitch its coupler to a tow hitch or tethering mechanism of a tow entity. In some embodiments, the jacking mechanism may enable or semi-manual (e.g., external electronic jacking interface of the AEP trailer) or manual intervention (e.g., a manual crank) for lifting and/or lowering a coupler of the AEP trailer system 100 to a tethering mechanism.

1.40 Electric Motors

The one or more electric motors 140 of the AEP trailer system 100 preferably function to produce torque for turning one or more of the plurality of wheels 120, the steerable axle 130, and/or the jacking mechanism of the AEP trailer system 100. In one or more embodiments, the one or more electric motors 140 may be powered by energy outputs of the battery subsystem 145 to generate the torque outputs for operating one or more mechanisms (e.g., wheels, jack, etc.) of the AEP trailer system 100.

As mentioned above, the one or more motors 140, in varying embodiments, may be arranged along the chassis 110 and/or the plurality of wheels 120 in any suitable manner for achieving a steering and driving of the AEP trailer system 100. In one implementation, the one or more motors 140 may be arranged along an axle shared between pairs of wheels. In another implementation, the one or more motors 140 may be arranged on distinct, independent axles that uniquely power each respective wheel of the plurality of wheels 120. In a further implementation, a combination of the aforementioned implementations may be combined to optimize driving and/or steering operations of the AEP trailer system 100.

1.45 Battery Subsystem

The battery subsystem 145 is preferably in electrical communication with each of the electric-powered components of the AEP trailer system 100 and may function to provide energy outputs to the electric-powered components based on control signals from the autonomous trailer control subsystem 160.

Additionally, or alternatively, the battery subsystem 145 may include a battery stack that may include a plurality of distinct batteries or energy storage devices. In one or more embodiments, the battery stack may include a plurality of distinct batteries in which subsets of one or more batteries may be dedicated to a distinct electric-powered component of the AEP trailer system 100. In this way, power consumption of various electronic components of the AEP trailer system 100 and/or the over consumption of the electric-powered components may be intelligently managed to increase safety and/or efficiency of the AEP trailer system 100.

1.50 Sensing Devices

The sensor suite 150 preferably functions to observe and/or collect data from one or more components of the AEP trailer system 100, an environment and/or circumstances surrounding the AEP trailer system 100 and/or a tow entity, a coupler component and/or coupled subsystem, and/or the like. Accordingly, in one or more embodiments, the sensor suite 150 may function to periodically and/or continuously measure a behavior of static and dynamic objects in an environment of the AEP trailer system 100, a behavior of a tow entity (in either a tethered or untethered state) and measure self-behavior.

Figure 3A:
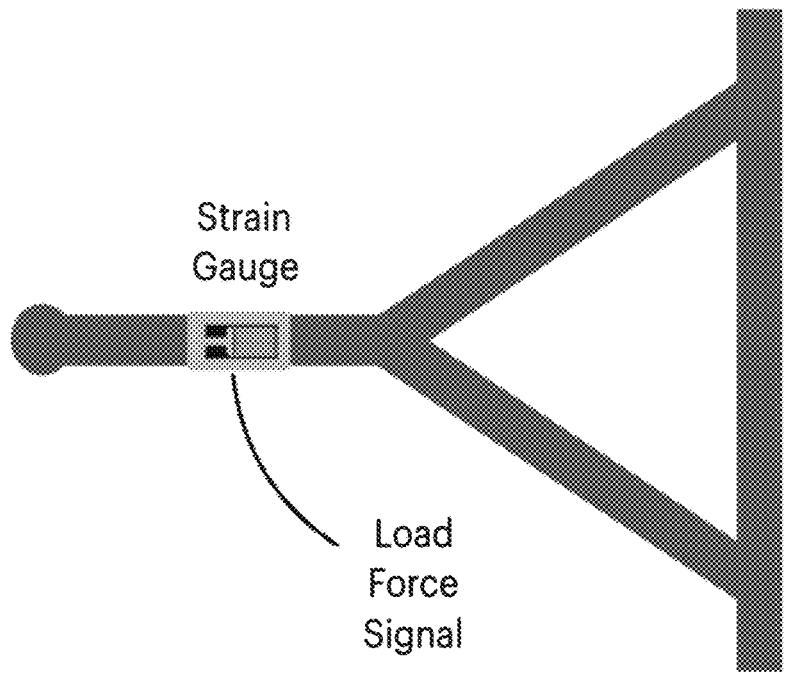
FIG. 3A illustrates a first example implementation for measuring load forces acting on an AEP trailer in accordance with one or more embodiments of the present application.
Figure 3B:
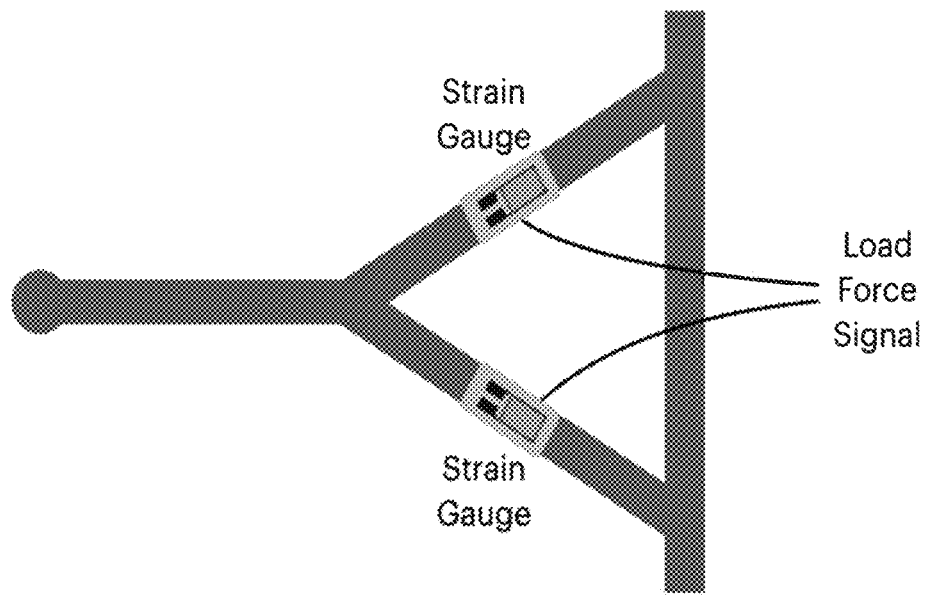
FIG. 3B illustrates a second example implementation for measuring load forces acting on an AEP trailer in accordance with one or more embodiments of the present application.

In a preferred embodiment, the sensor suite 150 or onboard sensors (e.g., computer vision system, LIDAR, RADAR, ultrasonic sensors, pressure sensors, wheel speed sensors, encoders, IMU, GPS, cameras, etc.) are in operable communication with the autonomous trailer control subsystem 160. Additionally, or alternatively, the sensor suite 150 may comprise one or more strain gauge load sensors for measuring towing load forces acting on the AEP trailer. These one or more strain gauge load sensors, in some embodiments, may be mounted on a tongue of the AEP trailer (as generally illustrated in FIG. 3A), mounted on an A-frame coupled to the AEP trailer tongue (as generally illustrated in FIG. 3B), and/or mounted at a plurality of other locations on the AEP trailer chassis 110.

The sensor suite 150 preferably includes sensors used to perform autonomous trailer operations (such as automated tethering, towing propulsion assist, autonomous driving, and/or the like) and data capture regarding the circumstances surrounding the AEP trailer system 100 as well as data capture relating to operations of the AEP trailer system 100, but may additionally or alternatively include sensors dedicated to detecting maintenance needs of the AEP trailer system 100. For example, the sensor suite 150 may include motor feedback and/or diagnostic sensors or an exterior pressure sensor strip. As another example, the sensor suite 150 may include sensors dedicated to identifying a position of a tethering nexus (e.g., a tow hitch or the like) relative to a position of the AEP trailer system 100.

1.60 Autonomous Trailer Control Subsystem

The AEP trailer system 100 preferably includes an autonomous trailer control subsystem 160 (e.g., an onboard computer operably integrated with the AEP trailer) but can additionally or alternatively be decoupled (e.g., not onboard) from the AEP trailer system 100 (e.g., a user mobile device operating independent of the autonomous trailer). That is, in one or more embodiments, parts of the autonomous trailer control subsystem 160 may be operated and/or performed remotely by one or more external computing systems (e.g., a mobile user device, remote cloud computing system) that be may in operable control communication with the AEP trailer system 100 (e.g., via a network, short-range communication system, and the like).

Additionally, or alternatively, the autonomous trailer control subsystem 160 may include a processing system (e.g., graphical processing unit (GPU), central processing unit (CPU), or any suitable processing circuitry) as well as memory and a sensor fusion system. The memory can be short term (e.g., volatile, non-volatile, random access memory or RAM, etc.) and/or long term (e.g., flash memory, hard disk, etc.) memory.

In one or more embodiments, the sensor data fusion system may function to synthesize and process sensor data for deriving artifacts (e.g., load measurements, tow vehicle acceleration/braking, and the like), predicting the presence, location, classification, and/or path of objects and features of the environment of the AEP trailer system 100. In various embodiments, the sensor data fusion system may function to incorporate data from multiple sensors and/or data sources, including but not limited to cameras, LIDARS, radars, remote data feeds (Internet-based data feeds, weather feeds, and the like), and/or any number of other types of sensors.

As discussed below, the AEP trailer system 100 may additionally include a trailer communication interface 180 that includes a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, trailer pin connectors (e.g., 4 pin, 7 pin, or the like), or any other suitable wired data communication system or protocol), sensors, and/or a data transfer bus (e.g., CAN, FlexRay). In a preferred embodiment, the autonomous trailer control subsystem 160 may operate to interact with and/or operably control any or one or more of the identified components or modules described herein.

Additionally, or alternatively, the AEP trailer system 100 may be in operable communication with a remote or disparate computing system that may include a user device (e.g., a mobile phone, a laptop, etc.), a remote server, a cloud server, or any other suitable local and/or distributed computing system remote from the AEP trailer system 100. The remote computing system may preferably be connected to one or more systems of the autonomous trailer through one or more data connections (e.g., channels), but can alternatively communicate with the AEP trailer system in any suitable manner.

The autonomous trailer control subsystem 160 preferably functions to control the AEP trailer system 100 and process sensed data from a sensor suite (e.g., a computer vision system, LIDAR, flash LIDAR, wheel speed sensors, GPS, etc.) of the AEP trailer system 100 and/or other sensors to determine states of the AEP trailer system 100 and/or states of agents in an operating environment of the AEP trailer system 100. Based upon the states of the autonomous trailer and/or agents in the operating environment and programmed instructions, the autonomous trailer control subsystem 160 preferably modifies or controls behavior of AEP trailer system 100.

The autonomous trailer control subsystem 160 is preferably a general-purpose computer adapted for I/O communication with AEP trailer control systems and sensor systems but may additionally or alternatively be any suitable computing device.

Additionally, or alternatively, the autonomous trailer control subsystem 160 is preferably connected to the Internet via a wireless connection (e.g., via a cellular link or connection). Additionally, or alternatively, the autonomous trailer control subsystem 160 may be coupled to any number of wireless or wired communication systems.

The positioning system processes sensor data along with other data to determine a position (e.g., a local position relative to a map, an exact position relative to lane of a road, AEP trailer heading, velocity, position relative to a tow vehicle, etc.) of the AEP trailer system 100 relative to the environment. Additionally, or alternatively, in an un-tethered state (e.g., the AEP trailer is disconnected from a tow hitch), the guidance system processes sensor data along with other data to determine a path for the AEP trailer system 100 to follow, e.g., in circumstances in which the AEP trailer system 100 may autonomously or semi-autonomously travel to a tow hitch or towing nexus of a tow vehicle. Additionally, or alternatively, in some examples, the AEP trailer system 100 may obtain or collect path planning data from an associated tow vehicle.

In various embodiments, the controller may function to implement machine learning techniques to assist the functionality of the controller, such as feature detection/classification, obstruction mitigation, route traversal, mapping, sensor integration, ground-truth determination, and the like.

Additionally, or alternatively, in some embodiments, the autonomous trailer control subsystem may include a vision perception system or module that include extensible machine learning-based objection classification sub-modules trained for predicting and/or classifying varying areas (e.g., a rear) of a tow entity, a position of tethering nexus, and/or the like.

Additionally, or alternatively, the vision perception system or module may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an a priori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the AEP trailer system 100. Further, any suitable model (e.g., machine learning, non-machine learning, etc.) may be implemented in the various systems and/or methods described herein.

1.80 Trailer-Tow Vehicle Communication Interface

The trailer-tow vehicle communication interface 180 preferably enables the AEP trailer system 100 to communicate and/or exchange data with systems, networks, and/or devices external to and/or that may be independent of the AEP trailer system 100. Preferably, the trailer-tow vehicle communication interface 180 enables one or more to entity devices and/or user devices/applications to communicate directly with the AEP trailer system 100. The trailer-tow vehicle communication interface 180 preferably includes one or more of a cellular system (or any suitable long-range communication system), direct short-wave radio, vehicle-to-vehicle (V2V) communication, vehicle-to-everything (V2X) communication, or any other suitable short-range communication system.

2. Method for Intelligently Configuring and Executing Autonomous Driving Operations at an AEP Trailer As shown in FIG. 2, a method 200 for intelligently configuring and executing autonomous driving behavior at an AEP trailer includes sourcing control-informative driving data (S210), deriving towing-informative control inputs (S220), generating AEP trailer control instructions (S230), autonomously executing driving operations (S240), and continuously executing safety and fault detection processes (S250).

The embodiments of the present application, as described in accordance with the system 100 and method 200, preferably function to provide assistive towing forces by a trailer being actively towed by a towing vehicle or the like. A typical towing entity, such as a tow vehicle, must typically negotiate multiple technical and safety hurdles when towing a trailer and, mainly, a trailer carrying a load. A few of the technical and safety hurdles may include, but should not be limited to, energy loss, fuel inefficiencies, increased driver stress, towing safety, and/or the like. Accordingly, an AEP trailer according to one or more embodiments described herein may function to compute an assistive towing force for causing the AEP trailer to assistively behave in a driving manner consistent with a tow vehicle that is towing the AEP trailer. In such embodiment(s), the assistive towing force may offset energy loss of the towing vehicle and/or improve a fuel efficiency of the towing vehicle by providing its own propulsion and/or braking, thereby reducing the energy and/or power output requirements of the towing vehicle when towing the AEP trailer. Additionally, in one or more embodiments, the AEP trailer may function to generate towing and/or driving safety-related metrics, such as a sway metric of the AEP trailer. In such embodiments, these towing and/or driving safety-related metrics may aid the AEP trailer in mitigating sway and/or other unintended driving or towing responses. Altogether, the AEP trailer described herein addresses the various technical and safety problems that towing vehicles may have to confront to successfully, efficiently, and safely tow a trailer, thereby also reducing driver stress when performing a towing activity.

2.10 Sourcing Control-Informative Driving Data

S210, which includes sourcing control-informative driving data, may function to identify or collect data indicative of a current (or future) operating state of an autonomous electric-powered (AEP) trailer and/or a tow vehicle towing the AEP trailer. The control-informative driving data, in a preferred embodiment of method 200, may be sourced by the AEP trailer. Accordingly, in such a preferred embodiment, the AEP trailer may function to interface with its own components, sensors, systems, or sub-systems, as well as interface directly (or indirectly) with components, sensors, systems, or subsystems external to the AEP trailer.

Additionally, as will be described in more detail herein, the control-informative driving data sourced by S210 may aid the AEP trailer (via one or more downstream processes of the method 200) in estimating a driving intent of a tow vehicle tethered to the AEP trailer and/or may enable the AEP trailer to autonomously assist the tow vehicle in towing the AEP trailer during a towing event.

Towing Load Forces

In some embodiments of method 200, sourcing control-informative driving data may include sourcing (or identifying) load forces acting on the AEP trailer during one or more states of operating the AEP trailer. It shall be noted that, in some embodiments, identifying the load forces actively acting on the AEP trailer may provide an efficient way for inferring/estimating a driving state or driving behavior of the tow vehicle (e.g., if the tow vehicle is accelerating, decelerating, or the like) and particularly in circumstances when such information cannot be readily obtained directly from the tow vehicle.

In a first implementation, to identify the load forces currently acting on the AEP trailer, the AEP trailer (or a system in communication with the AEP trailer) may function to measure one or more load forces acting on a tethering nexus or a point of connection between the AEP trailer and a tow vehicle. In such implementation, sourcing the control-informative driving data may include interfacing with and/or measuring forces acting on a strain gauge load cell mounted on a tongue of the AEP trailer ("AEP trailer tongue"), as generally illustrated in FIG. 3A. In some embodiments, the strain gauge load cell may function to produce an output voltage corresponding to the current strain/stress being exerted on the strain gauge load cell, which in turn, may be read/obtained by the AEP trailer to determine whether the associated tow vehicle is accelerating, decelerating, or maintaining a steady state and, preferably, determine a magnitude of acceleration or deceleration and/or velocity of the tow vehicle. For instance, in a non-limiting example, if the output voltage generated by the strain gauge load cell indicates that forces are compressing the strain gauge load cell, the AEP trailer may determine that the associated tow vehicle is decelerating (e.g., braking). Conversely, if the output voltage generated by the strain gauge load cell indicates that forces are stretching the strain gauge load cell, the AEP trailer may determine that the associated tow vehicle is accelerating.

It shall be noted that the above-described implementation is not intended to be limiting and that one or more other strain gauge load cells may additionally, or alternatively, be located at different positions on the AEP trailer chassis 110 without departing from the scope of the invention(s). For instance, as opposed to only one strain gauge load cell being mounted on the tongue of the AEP trailer, a plurality of strain gauge load cells may additionally (or alternatively) be mounted at a plurality of other locations on the AEP trailer chassis 110 to determine acceleration or deceleration characteristics of the associated tow vehicle, such as mounted on an A-frame coupled to the AEP trailer tongue, as generally illustrated in FIG. 3B.

Figure 4A:
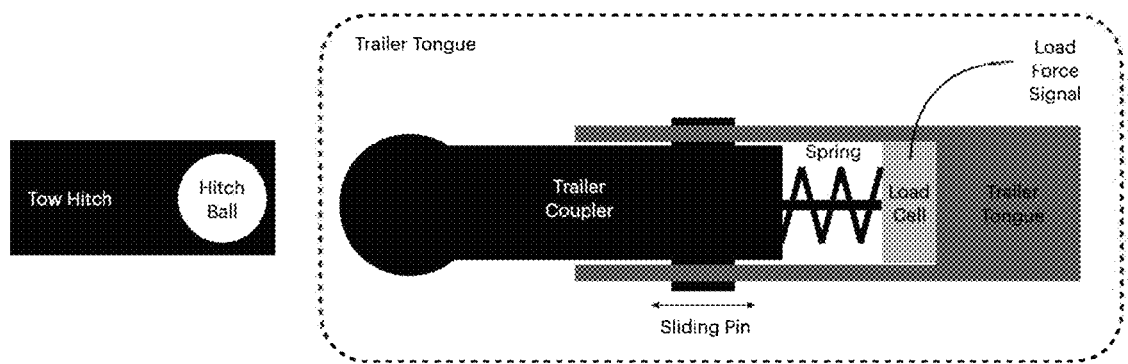
FIG. 4A illustrates a third example implementation for measuring load forces acting on an AEP trailer in accordance with one or more embodiments of the present application.
Figure 4B:
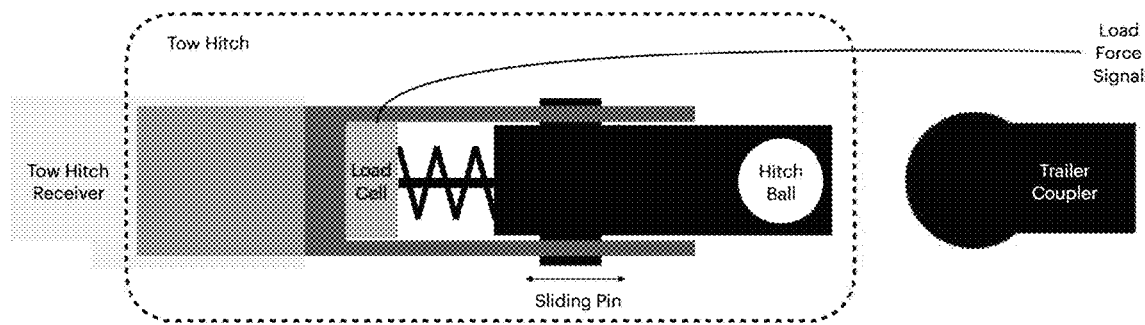
FIG. 4B illustrates a fourth example implementation for measuring load forces acting on an AEP trailer in accordance with one or more embodiments of the present application.

In a second implementation, the AEP trailer may function to measure or estimate towing load forces, including estimating acceleration/deceleration characteristics of the associated tow vehicle, by interfacing with a spring-loaded load cell located proximal to a tongue coupler of the AEP trailer (described in system 100) and/or by interfacing with a spring-loaded load cell located proximal to a tow hitch of the tow vehicle (also described in system 100), as generally illustrated in FIGS. 4A and 4B. In such embodiments of method 200, the AEP trailer may function to interface with the one or more spring-loaded load cells in similar ways described with respect to the one or more strain gauge load cells. For instance, in a non-limiting example, if an output voltage generated by a spring-loaded load cell indicates that forces are compressing a spring of the spring-loaded load cell, the AEP trailer may determine that the associated tow vehicle is decelerating (e.g., braking). Conversely, if the output voltage generated by the strain gauge load cell indicates that forces are applying tension to the spring of the spring-loaded load cell, the AEP trailer may determine that the associated tow vehicle is accelerating.

Figure 7A:
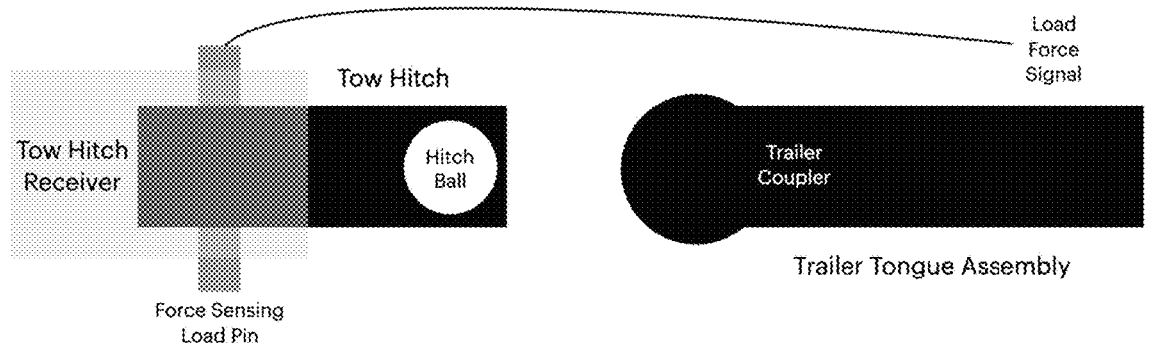
FIGS. 7A and 7B illustrate a fifth and sixth example implementation for measuring load forces acting on an AEP trailer in accordance with one or more embodiments of the present application.
Figure 7B:
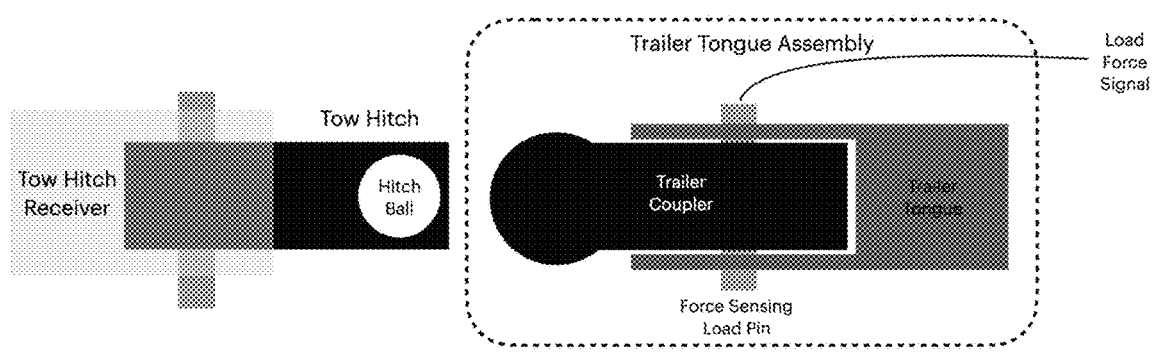

In a third implementation, the AEP trailer may function to measure or estimate towing load forces, including estimating acceleration/deceleration characteristics of the associated tow vehicle, by interfacing with one or more load measuring locking pins that may be positioned within existing locking pin locations at the tow hitch receiver and tow hitch (FIG. 7A) and/or at the AEP trailer tongue assembly (FIG. 7B). In such embodiments of method 200, the AEP trailer may function to interface with the one or more load measuring locking pins in similar ways described in previous examples/embodiments to estimate acceleration/deceleration characteristics of the associated tow vehicle. Accordingly, in operation, S210 may function to implement the load measuring locking pins for measuring towing load forces between a tow vehicle and AEP trailer to infer a driving intent of the tow vehicle. It shall be recognized that while the present disclosure generally the instant towing forces measuring mechanism as a "load measuring locking pin" or "load measuring pin", the mechanism may be any extended member that may be positioned or inserted between a tow hitch receiver and tow hitch or AEP trailer tongue assembly.

In a fourth implementation, the AEP trailer may function to measure or estimate towing load forces, including estimating acceleration/deceleration characteristics of the associated tow vehicle, by interfacing with one or more position sensors (e.g., one or more suspension travel sensors, one or more ride height sensors, and/or the like). In such embodiments, the one or more position sensors may be configured to measure positional changes of a locking pin (also referred to herein as a "sliding pin") relative to the position of the locking pin in an unloaded state (non-towing state). Accordingly, in operation, the AEP trailer may function to infer acceleration/deceleration characteristics of the AEP trailer based on the measured change in position of the locking pin and a current spring rate of a towing spring (e.g., by multiplying the measured positional change of the locking pin by the current spring rate).

Figure 8A:
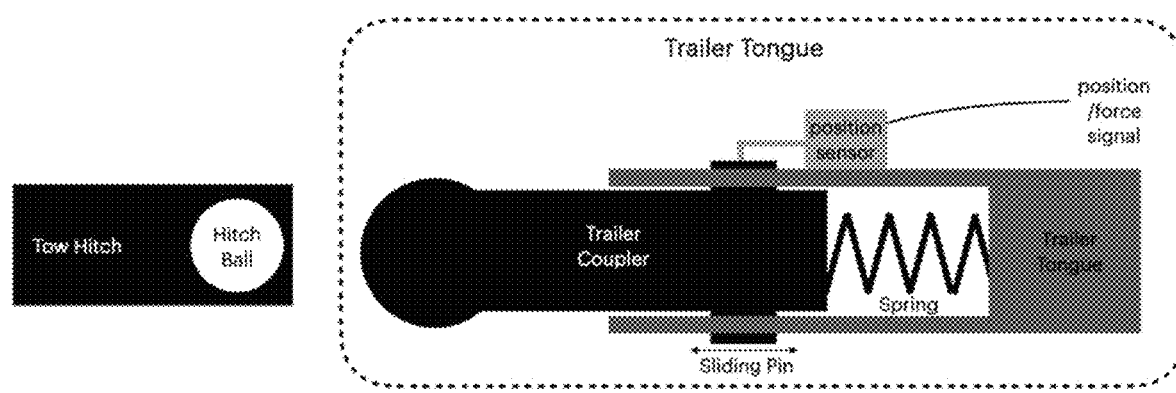
FIGS. 8A and 8B illustrate a seventh and eighth example implementation for measuring load forces acting on an AEP trailer in accordance with one or more embodiments of the present application.
Figure 8B:
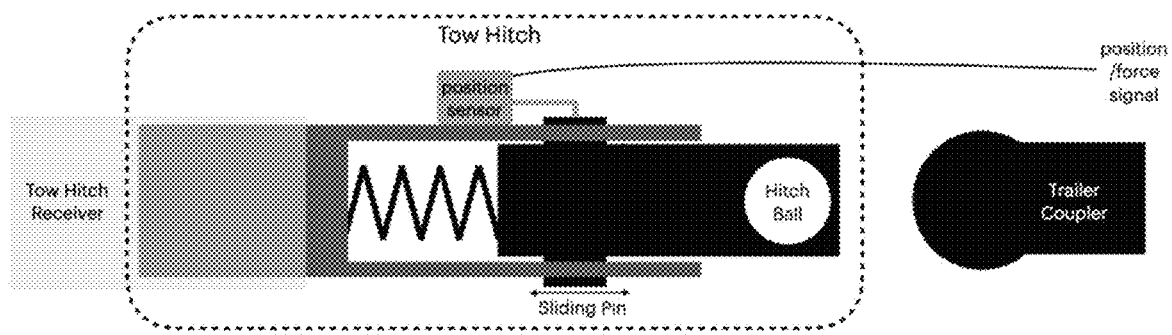

It shall be recognized that, while FIGS. 8A and 8B generally show examples of inferring a driving intent based on position changes of a locking pin, S210 may function to infer driving intent based on position changes of one or more other components of the AEP trailer or the associated tow vehicle without from the scope of the invention(s) contemplated herein.

Tow Vehicle Sensor Data

In some embodiments of method 200, sourcing the control-informative driving data may include sourcing (or collecting) sensor data sensed by the associated tow vehicle. Accordingly, in embodiments where the control-informative driving data may be sourced by the AEP trailer, S210 may function to wirelessly receive the sensor data from a wireless transceiver attached to (or in communication with) an OBDII port of the tow vehicle and/or via the trailer communication interface 180 described in the system 100. It shall be recognized that control-informative driving data may be sourced via any suitable means including, but not limited to, vehicle-to-vehicle communications. That is, S210 may function to source control-informative driving data based on data communicated between a non-towing vehicle and the tow vehicle.

In addition, or as an alternative, to the above-described embodiments, S210 may also obtain (or receive) the tow vehicle sensor data via "wired signals." Accordingly, in such embodiments, the tow vehicle sensor data may be transmitted to the AEP trailer via a trailer pin connector (e.g., SAE J2863 trailer connector) and/or via a separate communication path/bus.

In some embodiments, the sensor data that the AEP trailer receives or obtains from the associated tow vehicle may include, but may not be limited to, sensor data sensed via an inertial measurement unit (IMU) of the tow vehicle, sensor data sensed via an antilock braking system (ABS) of the tow vehicle, behavior-informative vehicle sensor data (e.g., steering angle data, acceleration data, accelerator pedal position data, brake pressure data), and/or the like. It shall be noted that, in some embodiments, the AEP trailer may additionally, or alternatively, receive data from other sensors or systems of the tow vehicle, such as future movement trajectory data, navigation path data, path planning data, vehicle location data, and/or the like from a global positioning system (GPS) of the tow vehicle.

AEP Trailer Sensor Data

In some embodiments of method 200, sourcing the control-informative driving data may include sourcing (or collecting) sensor data sensed via sensors of the AEP trailer. In such embodiments, the sensor data sourced via the sensors of the AEP trailer may include, but may not be limited to, rotational speed data for each (or at least one) wheel of the AEP trailer, current speed/velocity of the AEP trailer, acceleration rate of the AEP trailer, steering angle of the AEP trailer, orientation of the AEP trailer, environmental forces acting on the AEP trailer (e.g., wind) potentially causing sway, and/or the like.

It shall be noted that, in some embodiments, sourcing the control-informative driving data may additionally, or alternatively, include sourcing driving data external to both the AEP trailer and the associated tow vehicle, such as road temperature data, air temperature data, atmospheric pressure data, wind speed data, wind direction data, humidity data, precipitation data, cloudiness data, road visibility data, sunlight exposure data, road surface traction data, object data (e.g., other vehicles, people, etcetera along a travelling path of the AEP trailer), and/or the like. Accordingly, in such embodiments, the AEP trailer may source one or more of the above-described control-informative driving data via the trailer communication interface 180 described in system 100.

2.20 Deriving Towing-Informative Control Inputs

S220, which includes deriving towing-informative control inputs, may function to compute or derive input for one or more towing control algorithms autonomously governing the AEP trailer based on the control-informative driving data sourced in S210 (or based on activating a towing assist operating mode of the AEP trailer). In some embodiments of method 200, S220 may also function to route the derived towing-informative control inputs to corresponding towing control algorithms, which in turn, may cause the driving behavior of the AEP trailer to be automatically modified (as will be described in greater detail in S230-onward).

Furthermore, it shall be noted that, like S210, in some embodiments of the method 200, the towing-informative control inputs derived in S220, S250, and/or the other techniques/processes described within S220 may be performed at or by the AEP trailer (e.g., via a vehicle control unit (VCU) of the AEP trailer).

Data Pre-Conditioning|Data Pre-Processing

Figure 5:
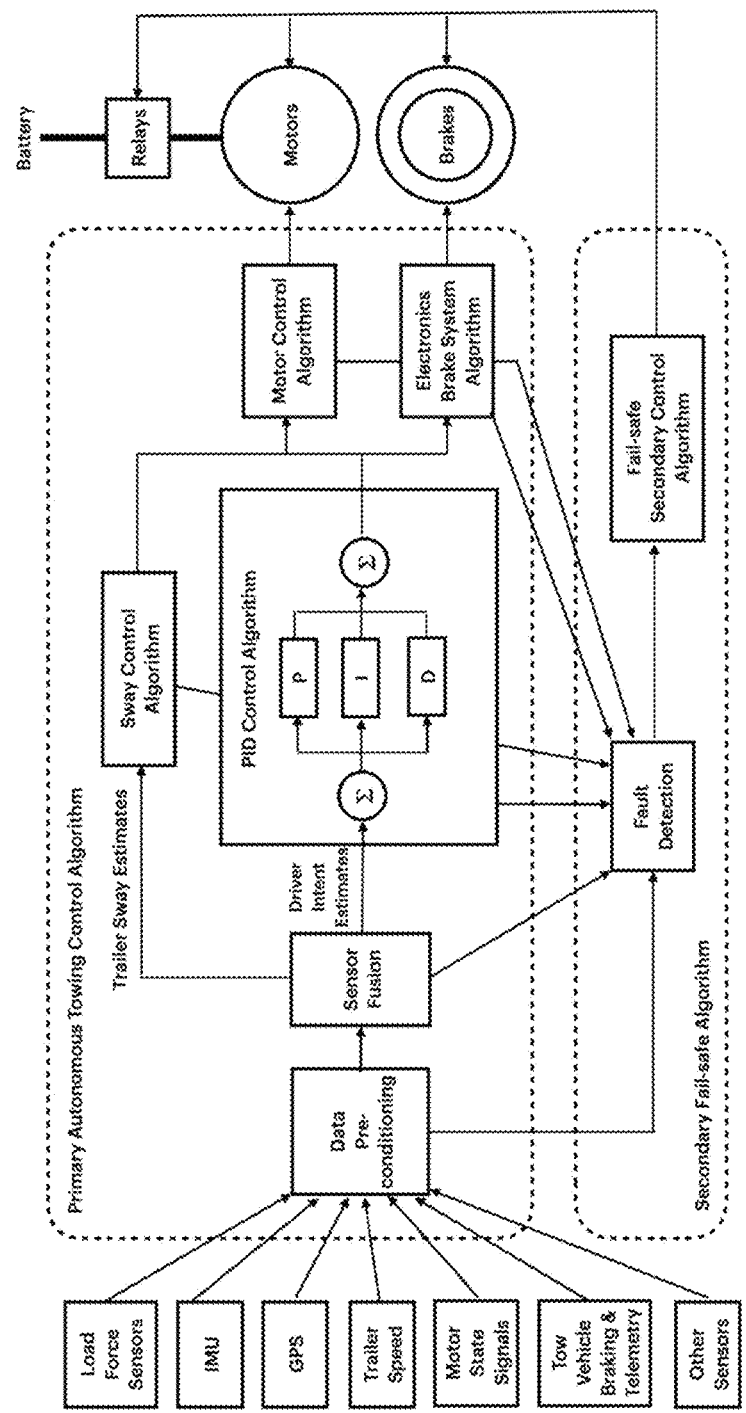
FIG. 5 illustrates an example schematic representation for implementing autonomous driving operations at an AEP trailer in accordance with one or more embodiments of the present application.

In some embodiments, deriving/estimating the one or more towing-informative control inputs may include pre-conditioning/pre-processing the control-informative driving data sourced in S210. In such embodiments, as illustrated in FIG. 5, S220 may function to implement a data pre-conditioning (fusion) module that may function to ingest the control-informative driving data sourced in S210 and execute one or more pre-conditioning algorithms of the data pre-conditioning module.

The one or more pre-conditioning algorithms of the data pre-conditioning module may function to reduce noise present in the sourced control-informative driving data, normalize the sourced control-informative driving data, compress the control-informative driving data, correct sensor data inconsistencies in the sourced control-informative driving data, identify and remove data outliers in the sourced control-informative driving data, reduce dimensionality of the sourced control-informative driving data, and/or the like.

Sensor Data Fusion

Additionally, or alternatively, in some embodiments, deriving the one or more towing-informative control inputs may include executing one or more data fusion processes on the pre-conditioned control-informative driving data (or the originally sourced control-informative driving data). In such embodiments, as generally illustrated in FIG. 5, S220 may function to implement a sensor data fusion system/module that functions to synthesize new control-informative driving artifacts by combining, weighting, correlating, and/or aggregating a plurality of distinct attributes/features of the sourced or pre-conditioned control-informative driving data together.

In some embodiments, the output of the sensor data fusion system may additionally, or alternatively, be based on heuristics/rules/driving relationships learned by one or more driving attention machine learning models, by a human driving expert, or the like.

Assistive Acceleration or Deceleration

In some embodiments, the sensor data fusion system may function to produce an inference relating to an amount of assistive acceleration or deceleration to generate via the AEP trailer (e.g., the amount to accelerate or decelerate the AEP trailer such that the tow vehicle requires less (or no additional) power or braking effort when towing the AEP trailer—as compared to towing the AEP trailer in a passive, non-assistive mode). In one example, to compute such an inference, the sensor data fusion system may implement an assistive towing algorithm or mathematical formula that may be configured to accept at least a subset of the sourced (or pre-conditioned) control-informative driving data as input and compute, based on the provided input, a target acceleration or deceleration value for the AEP trailer.

In some examples, the target acceleration or deceleration value produced by the assistive towing algorithm or formula may be influenced by an amount of towing assistance requested by the driver. For instance, in a non-limiting example if the driver of the tow vehicle is requesting complete (e.g., 100%) towing assistance, the sensor data fusion system may function to compute an assistive acceleration or deceleration value that matches the current acceleration or deceleration of the tow vehicle. Conversely, in another non-limiting example, if the driver of the tow vehicle is requesting partial towing assistance (e.g., 10%, 20%, 30%, 40%, or 50% towing assistance), the sensor data fusion system may function to compute an assistive acceleration or deceleration value according to the partial amount of towing assistance requested by the driver (e.g., an acceleration or deceleration value that is 10%, 20%, 30%, 40%, or 50% less than the current acceleration or deceleration of the tow vehicle).

Estimating Driving Intent

In some embodiments, as also generally illustrated in FIG. 5, one of the control-informative driving artifacts synthesized by the sensor data fusion system may correspond to an estimated driving intent of a driver operating the tow vehicle (or a driving intent of the tow vehicle if the tow vehicle is operating in an autonomous state). A driving intent, as generally referred to herein, preferably relates to a prediction of a current or future driving activity of the driver (or of an autonomous, semi-autonomous, or manual tow vehicle), the estimated time at which the predicted driving activity will occur, the estimated duration of the predicted driving activity, the estimated acceleration (or deceleration) rate of the tow vehicle during the predicted driving activity, and/or the like. It shall be noted that example predicted driving activities may include parking the tow vehicle, changing a current driving lane of the tow vehicle, turning the tow vehicle onto a different road, stopping the tow vehicle at an intersection, merging the tow vehicle into traffic, exiting a roadway with the tow vehicle, exiting a parking spot with the tow vehicle, or the like.

Example driving intent inferences that may be synthesized by the sensor data fusion system will now be described below. However, one of ordinary skill in the art would understand that the described examples are not intended to be limiting and that the sensor data fusion system may synthesize fewer, different, or additional driving intent inferences without departing from the scope of the invention(s) contemplated herein.

In a first non-limiting example, the sensor data fusion system may function to produce an inference indicating that the driver of the tow vehicle may perform a turning maneuver during a target time period based on identifying, from the sourced and/or pre-conditioned control-informative driving data, that a turn signal of the tow vehicle is currently activated and that GPS directions of the tow vehicle indicate a turning maneuver (in the direction of the activated turn signal) is required during the target time period.

In a second non-limiting example, the sensor data fusion system may function to produce an inference indicating that the driver of the tow vehicle may perform a respective amount of acceleration (and/or increase a current speed of the tow vehicle) during a target time period based on identifying, from the sourced and/or pre-conditioned control-informative driving data, that a speed limit of a road on which the tow vehicle is driving increases during the target time period.

In a third non-limiting example, the sensor data fusion system may function to produce an inference indicating that the driver of the tow vehicle will maintain a constant vehicle speed during a target time period based on identifying, from the sourced and/or pre-conditioned control-informative driving data, that cruise control is set to a respective speed at the tow vehicle.

In a fourth non-limiting example, a driving attention machine learning model (as described previously) may have learned a deceleration relationship between a speed of the tow vehicle and foot pressure applied to a brake pedal of the tow vehicle. Accordingly, in such a non-limiting example and because of this learned relationship, the sensor data fusion system may comprise a machine learning-derived heuristic that can estimate how much a vehicle will decelerate over a target time period based on the learned relationship between the speed of the tow vehicle and foot pressure applied to the brake pedal of the tow vehicle.

Similarly, in a fifth non-limiting example, a driving attention machine learning model may have learned an acceleration relationship between an acceleration of the tow vehicle and foot pressure applied to an acceleration pedal of the tow vehicle. Accordingly, in such a non-limiting example and because of this learned relationship, the sensor data fusion system may comprise a machine learning-derived heuristic that can estimate how much a vehicle will accelerate over a target time period based on the learned relationship between the acceleration of the tow vehicle and foot pressure applied to the brake pedal of the tow vehicle.

Trailer Sway Estimation

As also illustrated in FIG. 5, in some embodiments, the sensor data fusion system may synthesize/generate one or more other towing-informative control inputs in addition, or as an alternative, to the towing-informative control input estimating the driving intent of the driver operating the tow vehicle. For instance, in a non-limiting example, the sensor data fusion may function to additionally, or alternatively, synthesize/generate a towing-informative control input relating to an estimation or probability of the AEP trailer swaying during towing.

It shall be noted that trailer sway, as generally referred to herein, preferably relates to a scenario in which lateral or forward/backward forces cause the AEP trailer to move (rhythmically) from side-to-side or forward and backward, and possibly, cause the AEP trailer or the associated tow vehicle to unintentionally rollover or move in a manner opposed to an intended driving behavior of the AEP trailer.

Example trailer sway inferences that may be synthesized by the sensor data fusion system may be described below. However, one of ordinary skill in the art would understand that the described examples are not intended to be limiting and that the sensor data fusion system may synthesize fewer, different, or additional AEP trailer sway inferences without departing from the scope of the invention(s) contemplated herein.

In a first non-limiting example, the sensor data fusion system may function to estimate that the AEP trailer has a first probability of swaying based on identifying, from the sourced and/or pre-conditioned control-informative driving data, that more than a threshold amount of cargo weight is located in an aft portion of the AEP trailer (e.g., back half of the AEP trailer) and that the speed of the tow vehicle is operating above a threshold speed.

Similarly, in a second non-limiting example, the sensor data fusion system may function to estimate that the AEP trailer has a second probability of swaying based on identifying, from the sourced and/or pre-conditioned control-informative driving data, that the total cargo weight of the items stored in the AEP trailer exceed a maximum hauling weight defined by the AEP trailer.

In some embodiments, if the sensor data fusion system determines that the sourced and/or pre-conditioned control-informative driving data satisfies conditions of both the first non-limiting example and the second non-limiting example, the sensor data fusion system may determine that the AEP trailer has a higher probability of swaying than if conditions of only one of the first or the second non-limiting example were satisfied. Conversely, in some embodiments, if the sensor data fusion system determines that the sourced and/or pre-conditioned control-informative driving data neither satisfy conditions of the first non-limiting example and/or the second non-limiting example, the sensor data fusion system may determine that the AEP trailer has a lower probability of swaying than if the conditions in the first and/or the second non-limiting example were satisfied.

In yet a further example, the sensor data fusion system may function to estimate a sway metric value based on detected lateral or forward/backward movement of a body and/or a load of the AEP trailer beyond a sway movement threshold (e.g., a maximum movement in either a normal or y-axis direction of the AEP trailer). In a non-limiting example, a sensor, such as a camera, positioned on the AEP trailer (or possibly the tow vehicle) may function to measure an orientation of the body or a load of the AEP trailer relative to a surface normal or pedicular to the AEP trailer. In such non-limiting example, the sensor data fusion system may function to determine whether a load or a body of the AEP trailer may not be perpendicular or normal to a driving surface thereby indicating potential swaying or if constantly in an offset (or non-perpendicular/non-normal position), whether the AEP trailer may be unbalanced thereby producing an unbalanced metric value.

Other examples of estimating AEP trailer sway may include, but may not be limited to: (1) obtaining differential load force characteristics/values via the one or more previously described strain gauge load sensors and computing a difference between a differential load force acting on a first (e.g., right) side of the AEP trailer and a second (e.g., left) side of the AEP trailer to determine if the AEP trailer is currently oscillating or swaying, (2) obtaining IMU (Gyro) sensors values measured by the AEP trailer to detect changes in heading oscillation over time, (3) periodically (or continuously) capturing, via one or more cameras installed at the AEP trailer, at least a portion of the rear of the tow vehicle and assessing whether the tow vehicle is currently swaying by analyzing a most recently captured image frame to a previously captured image frame, and/or the like.

2.30 Generating AEP Trailer Control Instructions

S230, which includes generating AEP trailer control instructions, may function to generate one or more AEP trailer control (e.g., driving) instructions based on the towing-informative control inputs derived in S220. In some embodiments, as illustrated in FIG. 5, the one or more AEP trailer control instructions may be generated, by one or more towing control algorithms autonomously governing the AEP trailer, based on the one or more towing control algorithms receiving, as input, a derived towing-informative control input.

It shall be noted that, like S210 and S220, in some embodiments of the method 200, the one or more trailer control instructions may be generated by the AEP trailer. Accordingly, in some embodiments where the AEP trailer control instructions are generated by the one or more towing control algorithms, the one or more towing control algorithms may be implemented at and/or executed by a vehicle control unit (VCU) of the AEP trailer that is specifically configured to execute and interface with applications, algorithms, systems, and/or subsystems of the AEP trailer, among others.

Trailer Sway-Avoidance Control Instructions

In some embodiments, generating the one or more AEP trailer control instructions may include generating trailer sway-avoidance control instructions. The generated trailer sway-avoidance control instructions, as illustrated in FIG. 5, may serve as input to a motor control algorithm/system that is configured to control one or more distinct motors of the AEP trailer and/or serve as input to a brake control algorithm/system that is configured to control one or more distinct braking components of the AEP trailer.

In some embodiments, the generated trailer sway-avoidance control instructions may function to stabilize the AEP trailer (if the AEP trailer is currently swaying) and/or function to prevent the possibility of the AEP trailer swaying in the future. Furthermore, in some embodiments, the trailer sway-avoidance control instructions may comprise a distinct target rotational speed for each (or at least one) wheel of the AEP trailer, a distinct target braking torque signal for each (or at least one) wheel of the AEP trailer, a distinct target motor torque signal for each (or at least one) motor of the AEP trailer, and/or the like.

It shall be noted that, in some embodiments, the trailer sway-avoidance control instructions may include instructions for applying different (or the same) propulsion or braking amounts to different wheels of the AEP trailer. In other words, in some embodiments, the trailer sway-avoidance control instructions may indicate different braking torque or motor torque targets for each wheel of the AEP trailer to allow the AEP trailer to modulate each wheel of the AEP trailer in an independent, disproportionate, and/or asymmetric manner-which may be advantageous in quickly and efficiently stabilizing the AEP trailer.

In some embodiments, as illustrated in FIG. 5, the trailer sway-avoidance control instructions may be generated by a trailer sway control algorithm implemented on a VCU of the AEP trailer. In such embodiments, the trailer sway control algorithm may function to receive, as input, the towing-informative control input relating to the probability of the AEP trailer swaying (derived in S220) and produce, as output, appropriate trailer sway-avoidance control instructions based on the provided input.

In some embodiments, the trailer sway control algorithm may reference a lookup table, database, machine learning model, or the like to generate/determine the appropriate trailer sway-avoidance control instructions. That is, in a non-limiting example, the trailer sway control algorithm may function to access a lookup table that correlates the derived control-informative towing inputs to appropriate trailer sway-avoidance control instructions when generating/determining the trailer sway-avoidance control instructions.

Additionally, in some embodiments, based on the assessed criticality of the input provided to the trailer sway control algorithm, the trailer sway control algorithm may or may not function to forward trailer sway-avoidance control instructions to the motor control algorithm and/or the braking control algorithm of the AEP trailer. For instance, in a non-limiting example, if the trailer sway control algorithm determines, from the provided input, that the AEP trailer has less than a threshold amount of probability of AEP trailer sway occurring, the trailer sway control algorithm may not forward control instructions to the above-described algorithms. Alternatively, if the trailer sway control algorithm determines, from the provided input, that the AEP trailer indicates more than a threshold amount of probability of AEP trailer sway occurring, the trailer sway control algorithm may forward control instructions to the above-described algorithms.

Primary Motor and Braking Control Instructions

Additionally, or alternatively, in some embodiments, generating the one or more AEP trailer control instructions may include generating primary motor and/or braking control instructions. That is, in some embodiments, the AEP trailer (or the system implementing the method 200) may function to generate primary motor and/or braking control instructions that primarily operate the motors and brakes of the AEP trailer, respectively-unless the VCU of the AEP trailer prioritizes the generated trailer sway control instructions (e.g., if the trailer sway control algorithm generates such instructions).

As illustrated in FIG. 5, in some embodiments, the primary motor and/or braking control instructions generated in S230 may be provided as input to the motor control algorithm/system of the AEP trailer and/or the brake control algorithm/system of the AEP trailer. In such embodiments, the primary motor control instructions and the primary braking control instructions may comprise a distinct target motor voltage signal for each (or at least one) motor of the AEP trailer and a distinct target braking voltage signal for each (or at least one) braking component of the AEP trailer, respectively.

In some embodiments, as also illustrated in FIG. 5, the primary motor and braking control instructions may be generated by a proportional-integral-derivative (PID) control algorithm implemented on a VCU of the AEP trailer. In such embodiments, the PID control algorithm may function to receive, as input, the towing-informative control input relating to the estimation of driver intent (derived in S220) and produce, as output, the above-described primary motor and braking control instructions based on the calculated proportional, integral, and derivative terms of the PID controller.

Furthermore, in some embodiments, the PID control algorithm may additionally, or alternatively, function to produce appropriate primary motor and braking control instructions based on receiving a target assistive acceleration or deceleration value as input (described in S220). Accordingly, in such embodiments, the PID control algorithm may function to produce primary motor and braking control instructions that, when executed, cause the acceleration or deceleration of the AEP trailer to (safely) converge towards the provided target assistive acceleration or deceleration value.

Additionally, or alternatively, in some embodiments, the primary motor and braking control instructions may be generated by referencing a lookup table, database, or machine learning model that correlates at least the driving intent-based towing-informative control input to appropriate primary motor and braking control instructions.

Figure 6:
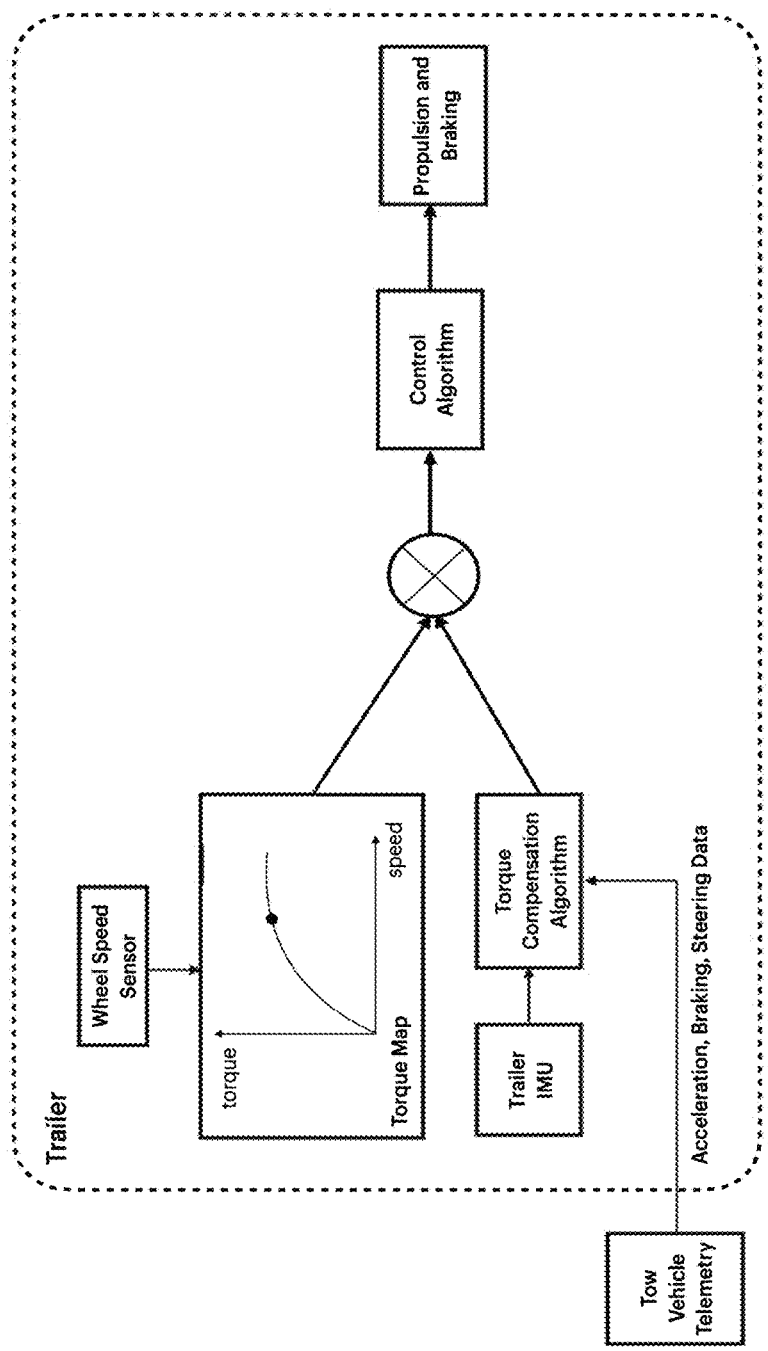
FIG. 6 illustrates an example schematic for generating AEP trailer control instructions in accordance with one or more embodiments of the present application.

In yet another example embodiment, as illustrated in FIG. 6, the primary motor and braking control instructions may be generated based on a pre-mapped torque vs. speed curve that at least informs a baseline amount of torque to send to the motors of the AEP trailer. In some embodiments, this determined baseline amount of may additionally be augmented based on current acceleration or braking characteristics of the tow vehicle, as will be described below.

For instance, in a non-limiting example, if the AEP trailer determines that the tow vehicle is traveling at 60 mph, the torque vs. speed curve may indicate that 200 Nm of torque may need to be applied to the wheels of the AEP trailer to offset the energy needed, by the tow vehicle, to move the AEP trailer. Contemporaneously with this determination, if the AEP trailer also identifies that an acceleration of 0.2 g is measured by the IMU of the tow vehicle, the AEP trailer may further determine that an additional torque of 200 Nm (e.g., a total of 400 Nm) is needed to offset the energy required, by the tow vehicle, to move the AEP trailer. Conversely, if the AEP trailer identifies that an acceleration of −0.5 g is measured by the IMU of the tow vehicle, the AEP trailer may determine that a total negative braking torque of −300 Nm is needed to offset the energy needed, by the tow vehicle, to move the AEP trailer.

AEP Trailer-to-Towing Vehicle Assistive Movement Algorithm or Controller

Additionally, or alternatively to the embodiments described above, the method 200 may function to compute or determine an amount of assistive torque (e.g., positive or negative torque) to provide to the tow vehicle based on an AEP trailer-to-towing vehicle assistive movement algorithm or controller. In some embodiments, the AEP trailer-to-towing vehicle assistive movement algorithm or controller may function to receive a plurality of towing or driving inputs collected or derived by the method 200 including, but not limited to, a current wheel speed of one or more wheels of the AEP trailer (e.g., a wheel speed of the 'left' wheels of the AEP trailer and a wheel speed of the 'right' wheels of the AEP trailer), a current linear acceleration of the AEP trailer, a current angular movement of the AEP trailer, and a brake activation signal identifying a current braking state of the towing vehicle.

In some embodiments, the AEP trailer-to-towing vehicle assistive movement algorithm or controller may comprise a plurality of driving computation or estimation components that each receive one or more of the plurality of towing or driving inputs collected by the method 200. For instance, the AEP trailer-to-towing vehicle assignment movement algorithm may include a body motion estimation module that functions to receive the current wheel speed of one or more wheels of the AEP trailer as input, a gravitational acceleration module that functions to receive the current linear acceleration of the AEP trailer and the current angular movement of the AEP trailer as input, and a brake activation determination module that functions to receive a brake activation signal associated with the towing vehicle as input.

In some embodiments, based on receiving the above-described inputs, the body motion estimation module may function to generate, as output, an estimate longitudinal speed of the AEP trailer and an estimated longitudinal acceleration of the AEP trailer. Correspondingly, based on receiving the above-described inputs, the gravitational acceleration module and the brake activation determination module may function to generate, as output, an estimated longitudinal gravitational acceleration of the AEP trailer and an estimated current braking state of the towing vehicle, respectively.

In some embodiments, the outputs generated by the body motion estimation module, gravitational acceleration module, and brake activation determination module may be provided to a plurality of downstream driving computation or estimation components. The plurality of downstream driving computation or estimation components may include, but may not be limited to, an AEP trailer roll compensation or mitigation component, an AEP trailer drag compensation or mitigation component, an AEP trailer acceleration compensation or mitigation component, and a road grade compensation or mitigation component.

The functions of such downstream driving computation or estimation components will now be described. In some embodiments, the AEP trailer roll compensation or mitigation component may function to receive the estimated longitudinal speed of the AEP trailer as input and compute, as output, an assistive linear roll compensation or mitigation value for the AEP trailer (e.g., an amount to assist the tow vehicle based on a current amount of power or torque required to move/roll the AEP trailer). In the some embodiments, the AEP trailer drag compensation or mitigation component may function to receive the estimated longitudinal speed of the AEP trailer as input and compute, as output, an assistive linear drag compensation or mitigation value for the AEP trailer (e.g., an amount to assist the tow vehicle based on current drag forces acting on the AEP trailer). In some embodiments, the AEP trailer acceleration compensation or mitigation component may function to receive the estimated longitudinal acceleration of the AEP trailer and the estimated current braking state of the towing vehicle as input and compute, as output, an assistive linear acceleration compensation or mitigation value for the AEP trailer (e.g., an amount to assist the tow vehicle based on a current acceleration of the AEP trailer). In some embodiments, the road grade compensation or mitigation component may function to receive the estimated longitudinal gravitational acceleration of the AEP trailer as input and compute, as output, an assistive linear road grade compensation or mitigation value for the AEP trailer (e.g., an amount to assist the tow vehicle based on a current grade of the road/path on which the AEP trailer is located).

Additionally, in some embodiments, the AEP trailer-to-towing vehicle assistive movement algorithm or controller may comprise an assistive torque filtering module (e.g., a low pass filter) that preferably functions to receive, as input, one or more of the assistive linear roll compensation or mitigation value, the assistive linear drag compensation or mitigation value, the assistive linear acceleration compensation or mitigation value, the assistive linear road grade compensation or mitigation value and compute, as output, a suggestive definitive torque assist value.

In some embodiments, the suggestive definitive torque assistive value outputted by the assistive torque filtering module may be further provided to a torque assist regulator module. In addition to the suggestive definitive torque assistive value outputted by the assistive torque filtering module, the torque assist regulator module may also receive the estimated current braking state of the towing vehicle as input. Based on these inputs, the torque assist regulator module may function to assess (or compare) the suggestive definitive torque assistive value against a pre-determined maximum amount of torque that can be applied to each of the wheels of the AEP trailer and output a regulated (e.g., limited) suggestive definitive torque assistive value if the assessment indicates that the suggestive definitive torque assistive value is greater than the pre-determined maximum amount of torque. Conversely, if the assessment of the suggestive definitive torque assistive value against the pre-determined maximum amount of torque indicates that the suggestive torque assistive value is lower than the pre-determined maximum amount of torque, the torque assist regulator module may forgo regulating (e.g., limiting) the inputted suggestive definitive torque assistive value. That is, in such embodiments, the output of the torque assist regulator module may be the suggestive definitive torque assistive value provided as input. It shall be noted that, in some portions of the disclosure, the above-mentioned outputs, such as suggestive definitive torque assistive value, may be referred to as AEP trailer control instructions and the execution of such instructions will be described in further detail in S240-S250.

2.40 Autonomously Executing Driving Operations

S240, which includes autonomously executing driving operations, may function to automatically execute (e.g., without human intervention) driving operations based on the AEP trailer control instructions generated in S230. That is, in some embodiments, S240 may function to autonomously govern/control the driving behavior of the AEP trailer in accordance with the AEP trailer control instructions generated in S230.

It shall be noted that, like S210-230, in some embodiments, the operations/processes described within S240 (including the execution of autonomous driving operations) may be performed by the AEP trailer. Furthermore, it shall also be noted that, in some embodiments, executing the autonomous driving operations may be an iterative and/or continuous process, which as illustrated in FIG. 5 may include one or more feedback loops or systems that continuously assist in executing the autonomous driving operations. Accordingly, in such embodiments, one or more steps of method 200 (e.g., S210-250) may be performed continuously or in a repeating sequential (or non-sequential) manner to support the execution of autonomous driving operations.

Executing Primary Motor Control Instructions

In some embodiments, executing the autonomous driving operations may include automatically executing the primary motor control instructions generated in S230. In one embodiment, to execute the primary motor control instructions generated in S230, S240 may function to route the generated primary motor control instructions to a motor control algorithm or system (as illustrated in FIG. 5).

In such an embodiment and in response to the motor control algorithm receiving the primary motor control instructions as input, the motor control algorithm may function to drive one or more electric motors of the AEP trailer according to the provided primary motor control instructions (e.g., according to the target drive voltage indicated by the primary motor control instructions). It shall be noted that, as described in system 100, the one or more electric motors of the AEP trailer may operate (e.g., turn) one or more wheels of the AEP trailer, and thus, driving the electric motors of the AEP trailer may adjust (or maintain) operating characteristics of the wheels of the AEP trailer (e.g., rotation speed).

Executing Primary Braking Control Instructions

In some embodiments, executing autonomous driving operations may include automatically executing the braking control instructions generated in S230. In one embodiment, to execute the primary braking control instructions generated in S230, S240 may function to route the generated primary braking control instructions to a brake control algorithm or system (as illustrated in FIG. 5).

In such an embodiment and in response to the braking control algorithm receiving the primary braking control instructions as input, the braking control algorithm may function to modulate one or more braking components of the AEP trailer according to the provided primary braking control instructions (e.g., according to the target braking voltage indicated by the primary braking control instructions). It shall be noted, as described in system 100, the one or more braking components of the AEP trailer may function to decelerate one or more wheels of the AEP trailer, and thus, modulating the braking components of the AEP trailer may adjust operating characteristics of the wheels of the AEP trailer (e.g., decrease rotational speed of the wheels).

Executing Trailer Sway-Avoidance Control Instructions

In some embodiments, executing autonomous driving operations may include automatically executing the trailer sway-avoidance control instructions generated in S230. In one embodiment, as illustrated in FIG. 5, to execute the trailer sway-avoidance control instructions generated in S230, S240 may function to route the trailer sway-avoidance control instructions to the above-described motor control algorithm and/or above-described brake control algorithm.

In such an embodiment and in response to the braking and/or motor control algorithms receiving the trailer sway-avoidance control instructions as input, the motor and/or braking control algorithms may function to modulate the one or more braking components of the AEP trailer and/or the one or more electric motors of the AEP trailer in accordance with the provided trailer sway-avoidance control instructions (e.g., according to the target braking and/or drive voltage indicated by the trailer sway-avoidance control instructions). It shall be noted that, as described in system 100, the one or more braking components of the AEP trailer and/or the one or more electric motors of the AEP trailer may drive or decelerate one or more wheels of the AEP trailer, respectively, and thus, modulating the braking components and/or the electric motors of the AEP trailer may adjust operating characteristics of the wheels of the AEP trailer (e.g., increase, decrease, or maintain rotation speed of one or more wheels of the AEP trailer).

It shall be noted that, in some instances where S230 generates multiple distinct control instructions (or conflicting control instructions), S240 may function to execute the control instructions based on priority. For instance, in a non-limiting example, if S230 generated trailer sway-avoidance control instructions as well as primary motor control instructions, S240 may function to determine that the trailer sway-avoidance control instructions have priority over the primary motor control instructions (e.g., because the trailer sway-avoidance control instructions relate to maintaining the safety of the AEP trailer), and thus, may function to prioritize the execution of the trailer sway-avoidance control instructions over the primary motor control instructions. Stated differently, in some embodiments, when S230 generates trailer sway-avoidance control instructions, S240 may function to overwrite (or ignore) other types of control instructions generated by S230 (e.g., primary motor control instructions).

2.50 Continuous Safety/Fault Detection

S250, which includes continuous safety and/or fault detection, may function to detect towing safety faults that may be occurring at the AEP trailer and/or the associated tow vehicle. Additionally, or alternatively, in some embodiments, S250 may function to override, modify, or augment the AEP trailer control instructions (generated in S230) based on a severity of a detected fault.

In some embodiments, to detects faults occurring at the AEP trailer and/or the associated tow vehicle, S250 may implement a fault detection module—as illustrated in FIG. 5—that detects possible faults during the sourcing of the control-informative driving data, the pre-conditioning of the control-informative driving data, the execution of the data fusion processes, the generation of the AEP trailer control instructions, the execution of autonomous driving operations, and/or the like.

In some embodiments, the fault detection module may function to identify faulty AEP trailer sensors and/or tow vehicle sensors, identify missing data in the sourced control-informative driving data, identify critical failures in the electric motors and/or braking components of the AEP trailer, identify errors in the transferring or receiving of driving data between different components of the AEP trailer (or the tow vehicle), and/or the like.

In some embodiments, when the fault detection module detects one or more faults, S250 may function to forward the detected one or more faults to a high integrity fail-safe algorithm. The high integrity fail-safe algorithm, in turn, may function to assess the criticality of the detected one or more faults and override the AEP trailer control instructions generated in S230. For instance, in a first non-limiting example, if the fault detection module detects that a sensor of the tow vehicle is faulty (e.g., an IMU sensor), the high integrity fail-safe algorithm may regulate (e.g., limit) the amount of propulsion or braking that can be applied to the electric motors and/or braking components of the AEP trailer. Similarly, in a second non-limiting example, if the fault detection module detects a fault in an electrical motor of the AEP trailer, the high integrity fail-safe algorithm may disconnect relays to the motors of the AEP trailer to prohibit power from being applied to the wheels of the AEP trailer.

In some embodiments, the mitigation actions taken by the high integrity fail-safe algorithm may be informed by a lookup table, database, or the like that correlates the detected faults to appropriate mitigation actions.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for operating an autonomous electric-powered (AEP) trailer, the method comprising:
sourcing, by an AEP trailer, sensor data indicative of a driving behavior of a towing entity;
estimating, by the AEP trailer, a likely driving intent of the towing entity based on the sensor data;
generating, by the AEP trailer, one or more tow-assist control instructions based at least on the likely driving intent of the towing entity; and
executing, by the AEP trailer, the one or more tow-assist control instructions to operate one or more wheels of the AEP trailer at a target wheel rotation speed or a target braking, wherein executing the one or more tow-assist control instructions causes the AEP trailer to actively support the towing entity in performing the likely driving intent.

2. The method according to claim 1, wherein the one or more tow-assist control instructions are generated based on (A) the likely driving intent of the towing entity, and (B) the sensor data sourced by the AEP trailer.

3. The method according to claim 1, wherein the driving behavior of the towing entity is inferred from one or more sensors mounted on the AEP trailer.

4. The method according to claim 3, wherein:
the one or more sensors include a sensor measuring one or more position changes of a load measuring pin that is arranged between a tow hitch of the towing entity and a component of the AEP trailer, and
the driving behavior of the towing entity is inferred based on the sensor data indicating a position of the load measuring pin.

5. The method according to claim 1, wherein:
at least a subset of the one or more tow-assist control instructions are derived based on an amount of propulsion needed to mirror an acceleration of the towing entity, and
executing the one or more tow-assist control instructions includes:
providing the one or more tow-assist control instructions to a control algorithm of the AEP trailer, and
executing, via the control algorithm, the one or more tow-assist control instructions to accelerate the AEP trailer.

6. The method according to claim 1, wherein:
at least a subset of the one or more tow-assist control instructions are derived based on an amount of braking needed to mirror a deceleration of the towing entity, and
executing the one or more tow-assist control instructions includes:
providing the one or more tow-assist control instructions to a control algorithm of the AEP trailer, and
executing, via the control algorithm, the one or more tow-assist control instructions to decelerate the AEP trailer.

7. The method according to claim 1, wherein:
at least a subset of the one or more tow-assist control instructions are derived based on an amount of assistive torque needed by the towing entity, and
executing the one or more tow-assist control instructions includes:
providing the one or more tow-assist control instructions to a control algorithm of the AEP trailer, and
executing, via the control algorithm, the one or more tow-assist control instructions to generate the amount of assistive torque via the one or more wheels of the AEP trailer.

8. The method according to claim 1, wherein:
the one or more tow-assist control instructions are generated based on an estimated amount of towing assistance needed by the towing entity, and
the estimated amount of towing assistance is at least derived from the likely driving intent of the towing entity.

9. The method according to claim 1, wherein:
the sensor data includes observations of one or more vehicle dynamics states of the towing entity, and
the one or more tow-assist control instructions are generated based on (A) the likely driving intent of the towing entity and (B) an amount of towing assistance needed by the towing entity, the method further comprising:
estimating the amount of towing assistance to provide to the towing entity based on the one or more vehicle dynamics states.

10. The method according to claim 9, wherein estimating the amount of towing assistance includes estimating an amount of assistive torque or braking to generate via at least one wheel of the AEP trailer.

11. The method according to claim 9, wherein:
the sensor data includes an amount of strain imposed on a tow hitch of the AEP trailer, and
estimating the amount of towing assistance to provide to the towing entity includes:
converting the amount of strain imposed on the tow hitch to a proportional amount of towing assistance.

12. The method according to claim 9, wherein estimating the amount of towing assistance includes estimating an amount of steering assistance needed to emulate a steering angle of the towing entity.

13. The method according to claim 12, wherein generating the one or more tow-assist control instructions include:
generating a tow-assist control instruction that independently controls a first wheel of the AEP trailer based on the amount of steering assistance, and
generating a tow-assist control instruction that independently controls a second wheel of the AEP trailer based on the amount of steering assistance.

14. The method according to claim 1, wherein:
the sensor data includes a towing force present at a towing *nexus* arranged between the AEP trailer and the towing entity.

15. A method for operating an electric-powered trailer, the method comprising:
sourcing, by an electric-powered trailer, sensor data during a towing event involving the electric-powered trailer and a towing entity;
estimating, by the electric-powered trailer, a likely driving intent of the towing entity based on the sensor data;
generating, by the electric-powered trailer, one or more tow-assist control instructions based at least on the likely driving intent of the towing entity; and
executing, by the electric-powered trailer, the one or more tow-assist control instructions to operate one or more wheels of the electric-powered trailer at a target wheel rotation speed or a target braking.

16. The method according to claim 15, wherein the one or more tow-assist control instructions are generated based on (A) the sensor data sourced by the electric-powered trailer, and (B) the likely driving intent of the towing entity.

17. The method according to claim 15, wherein:
the sensor data is indicative of a driving behavior of the towing entity, and
the driving behavior of the towing entity is inferred from one or more sensors mounted on the electric-powered trailer.

18. The method according to claim 15, wherein:
the sensor data includes a current acceleration or deceleration of the towing entity; and
at least a subset of the one or more tow-assist control instructions are derived based on an amount of propulsion or braking needed to mirror the current acceleration or deceleration of the towing entity.

19. The method according to claim 15, wherein:
the sensor data includes observations of one or more vehicle dynamics states of the towing entity, and
the one or more tow-assist control instructions are generated based on (A) the likely driving intent of the towing entity and (B) an amount of towing assistance needed by the towing entity, the method further comprising:

estimating the amount of towing assistance to provide to the towing entity based on the one or more vehicle dynamics states.

20. The method according to claim 15, wherein:

the sensor data includes a measurement of one or more position changes of a lock pin that is arranged between a tow hitch of the towing entity and a component of the AEP trailer, and a driving behavior of the towing entity is inferred based on the sensor data indicating a position of the locking pin.

* * * * *